United States Patent
Lee et al.

(10) Patent No.: US 12,539,534 B2
(45) Date of Patent: Feb. 3, 2026

(54) ALUMINUM COATED BLANK AND MANUFACTURING METHOD THEREOF

(71) Applicant: Hyundai Steel Company, Incheon (KR)

(72) Inventors: Chang Yong Lee, Incheon (KR); Sung Ryul Kim, Incheon (KR); Jeong Seok Kim, Incheon (KR); Joo Sik Hyun, Incheon (KR); Yoo Dong Chung, Incheon (KR); Soon Geun Jang, Incheon (KR)

(73) Assignee: Hyundai Steel Company, Incheon (KR)

( * ) Notice: Subject to any disclaimer, the term of this patent is extended or adjusted under 35 U.S.C. 154(b) by 0 days.

(21) Appl. No.: 18/400,526

(22) Filed: Dec. 29, 2023

(65) Prior Publication Data

US 2024/0149322 A1     May 9, 2024

Related U.S. Application Data

(63) Continuation of application No. 17/110,707, filed on Dec. 3, 2020, now Pat. No. 11,975,375.

(30) Foreign Application Priority Data

Oct. 29, 2020   (KR) .................. 10-2020-0142532

(51) Int. Cl.
*B23K 26/21*     (2014.01)
*B21D 22/02*     (2006.01)
(Continued)

(52) U.S. Cl.
CPC ............ *B21D 22/022* (2013.01); *B23K 26/21* (2015.10); *B23K 35/0261* (2013.01);
(Continued)

(58) Field of Classification Search
CPC ............ B21D 22/022; B23C 2101/185; B23C 2101/34; B23C 2101/04; B23C 26/21;
(Continued)

(56) References Cited

U.S. PATENT DOCUMENTS

| | | |
|---|---|---|
| 9,901,969 B2 | 2/2018 | Miyazaki et al. |
| 2002/0190035 A1 | 12/2002 | Giacobbe et al. |
| 2017/0120391 A1 | 5/2017 | Schmit et al. |
| 2020/0277975 A1 | 9/2020 | Canourgues et al. |
| 2021/0078103 A1 | 3/2021 | von der Heydt et al. |

FOREIGN PATENT DOCUMENTS

| | | |
|---|---|---|
| DE | 102017120051 A1 | 2/2019 |
| EP | 2737971 A1 | 6/2014 |

(Continued)

OTHER PUBLICATIONS

Communcation pursuant to Rile 114(2) EPC—Observations by a Third Party concerning the patentability of the inventoni of Eureopean Patent Application No. EP20200211519, mailed Jul. 28, 2022—specifically Graphs obtained with ThermoCalc for examples E4, E6, E7 and substrate S2 of PL1.

(Continued)

*Primary Examiner* — Lois L Zheng
(74) *Attorney, Agent, or Firm* — Fox Rothschild LLP

(57) ABSTRACT

According to an exemplary embodiment of the present disclosure, disclosed is an aluminum coated blank that includes a first coated steel sheet; a second coated steel sheet connected to the first coated steel sheet; and a joint portion that connects the first coated steel sheet to the second coated steel plate at a boundary between the first coated steel sheet and the second coated steel sheet.

12 Claims, 11 Drawing Sheets

(51) Int. Cl.
*B23K 35/02* (2006.01)
*B23K 35/30* (2006.01)
*C21D 9/46* (2006.01)
*C22C 38/02* (2006.01)
*C22C 38/04* (2006.01)
*C22C 38/06* (2006.01)
*B23K 101/18* (2006.01)
*B23K 103/04* (2006.01)

(52) U.S. Cl.
CPC ............ *B23K 35/3073* (2013.01); *C21D 9/46* (2013.01); *C22C 38/02* (2013.01); *C22C 38/04* (2013.01); *C22C 38/06* (2013.01); *B23K 2101/185* (2018.08); *B23K 2103/04* (2018.08); *C21D 2211/008* (2013.01)

(58) Field of Classification Search
CPC ............ B23C 26/322; B23C 35/0261; B23C 35/3053; B23C 35/3073; C21D 2211/008; C21D 9/46; C22C 38/001; C22C 38/02; C22C 38/04; C22C 38/06
See application file for complete search history.

(56) References Cited

FOREIGN PATENT DOCUMENTS

| | | | |
|---|---|---|---|
| EP | 3 441 178 A1 | 2/2019 | |
| EP | 3483297 A1 | 5/2019 | |
| EP | 2736672 B2 * | 10/2024 | ......... B23K 2101/34 |
| KR | 10-2009-0005004 A | 1/2009 | |
| KR | 10-2014-0131557 A | 11/2014 | |
| KR | 10-2018-0001354 A | 1/2018 | |
| KR | 10-2018-0058540 A | 6/2018 | |
| WO | 2015/132651 A2 | 9/2015 | |
| WO | 2019/042730 A1 | 3/2019 | |
| WO | 2019/102424 A1 | 5/2019 | |
| WO | 2019/166941 A1 | 9/2019 | |

OTHER PUBLICATIONS

First Examination Report issued Aug. 8, 2023 in corresponding Indian Patent Application No. 20117055205.
Official Communication issued Jan. 23, 2024 in corresponding European Patent Application No. 20211519.2.

* cited by examiner

ALUMINUM COATED BLANK AND MANUFACTURING METHOD THEREOF

CROSS-REFERENCE TO RELATED APPLICATION

This application is a continuation of U.S. patent application Ser. No. 17/110,707, filed on Dec. 3, 2020, which is based on and claims priority under 35 U.S.C. § 119 to Korean Patent Application No. 10-2020-0142532, filed on Oct. 29, 2020, in the Korean Intellectual Property Office, the disclosure of which is incorporated by reference herein in its entirety.

BACKGROUND

1. Field

The present disclosure relates to an aluminum coated blank and a manufacturing method thereof.

2. Description of the Related Art

Components of various strengths are used in vehicles. For example, portions that need to absorb energy during collision or turnover of a vehicle require relatively weak strength, and portions that need to maintain a shape to secure a space for the occupants' survival require strong strength.

This is because, when the strength of the portions that need to absorb energy during collision is too high, the portions deliver impact energy to other portions as it is without absorbing the impact energy to cause a problem of delivering excessive shock to a passenger and other portions of a vehicle.

Vehicles continuously require a reduction in weight and cost, and accordingly, it is necessary for one component to have partially different strengths.

Some section of a component requires a high strength to protect an occupant, but some section requires a relatively low strength to absorb impact energy.

For example, a B-pillar of a car may be representatively used as the component. The B-pillar has a lower portion that requires relatively a low tensile strength and an upper portion that requires a high tensile strength. The reason for a difference in strength is that a portion (an upper portion that needs to support a roof during turnover) that needs to maintain a shape with a high strength during collision of a vehicle and a portion (a lower portion having a high possibility of collision with another vehicle) that needs to absorb impact while being crushed are simultaneously required.

In addition, in order to obtain a stable space for preventing injuries of passengers, an upper portion of the B-pillar needs to be maintained in shape, thereby requiring a high strength. If the upper portion of the B-pillar is not maintained at a high strength, when a vehicle is turned over, a roof thereof may go down to pose a great threat to the safety of passengers. However, a lower portion of the B-pillar needs to be deformed and absorb impact energy, thus requiring a relatively low strength. This is because, when the lower portion of the B-pillar also has a high strength, impact energy is delivered to other structural materials without being absorbed during a side collision.

Although a specific requirement strength changes depending on the type or shape of a vehicle, a tensile strength of approximately 1500 MPa is required for an upper portion of the B-pillar, while a tensile strength of approximately 500 to 1,000 MPa is required for a lower portion of the B-pillar.

In the related art, a method is used in which components are formed of low-strength materials and thereafter a separate reinforcement material is adhered to a portion requiring a high strength, but when one component requires different strengths in sections, a material (or a thick material) with high hardenability is used for an upper portion, and a material (or a thin material) with a low strength and low hardenability is used for a lower portion, the two materials are bonded by laser to make a blank, and a final product is produced through a hot stamping process.

Meanwhile, a tailor welded blank (TWB) is manufactured by bonding two or more steel sheets having materials and thicknesses different from each other. An Al—Si coated layer is used on a surface of the TWB steel sheet.

However, when the coated steel sheets are bonded to each other by laser, components of the coated layer are introduced into a melted pool of the bonded (joint) portion, and thus, the bonded portion has different physical properties from the base material. When the coated layer is formed of aluminum-silicon (Al—Si) or zinc (Zn), coating components are introduced into the bonded portion during laser bonding, resulting in a decrease in mechanical properties.

Accordingly, it is possible to solve or minimize a reduction in strength of the bonded portion by components of a filler wire, but there is a problem that segregation may occur because the introduced components (Al) of a coated layer is not evenly diluted with a base material depending on materials (materials with a large amount of coating adhesion) and bonding conditions (high bonding speed), and the effects of the components of the filler wire may not be sufficient.

A background technology related to the present disclosure is disclosed in Korean Patent Publication No. 10-1637084 (published on Jul. 6, 2016, entitled "FILLER WIRE AND CUSTOMIZED WELDING BLANK MANUFACTURiNG METHOD USING THE SAME").

SUMMARY

According to an exemplary embodiment of the present disclosure, provided is an aluminum coated blank that may minimize a reduction in hardness and physical properties of a joint portion of a blank.

According to an exemplary embodiment of the present disclosure, provided is an aluminum coated blank that may prevent defects such as segregation of a joint portion of a blank from occurring.

According to an exemplary embodiment of the present disclosure, provided is an aluminum coated blank that may minimize a reduction in physical properties of a joint portion of a blank after a hot stamping process.

According to an exemplary embodiment of the present disclosure, provided is a manufacturing method of an aluminum coated blank.

An exemplary embodiment of the present disclosure provides an aluminum coated blank including a first coated steel sheet; a second coated steel sheet connected to the first coated steel sheet; and a joint portion that connects the first coated steel sheet to the second coated steel sheet at a boundary between the first coated steel sheet and the second coated steel sheet, wherein each of the first coated steel sheet and the second coated steel sheet includes a base iron and a coated layer that is formed with an adhesion amount of 20 to 100 g/m$^2$ on at least one surface of the base iron and includes aluminum, the base iron includes carbon (C) in an amount of 0.01 to 0.5 wt %, silicon (Si) of 0.01 to 1.0 wt %, manganese (Mn) in an amount of 0.5 to 3.0 wt %, phosphorus (P) in an amount greater than 0 and less than or equal to 0.05 wt %, sulfur (S) in an amount greater than 0 and less than or equal to 0.01 wt %, aluminum (Al) in an amount greater than 0 and less than or equal to 0.1 wt %, nitrogen (N) in an amount greater than 0 and less than or equal to 0.001 wt %, a remainder of iron (Fe), and other inevitable impurities, and the joint portion includes aluminum (Al) in an amount greater than or equal to 0.2 wt % and less than or equal to 2.0 wt %, manganese (Mn) in an amount greater than or equal to 0.8 wt % and less than or equal to 2.5 wt %, and carbon (C) in an amount greater than or equal to 0.1 wt % and less than or equal to 0.4 wt %, and ferrite is not formed above a highest Ac3 temperature of the first coated steel sheet and the second coated steel sheet.

In the exemplary embodiment of the present disclosure, when the aluminum coated blank is heated to at least Ac3 temperature to perform press molding and is cooled to 300° C. or lower at a cooling rate of 10° C./s to 500° C./s to perform hot stamping molding, an average hardness of the joint portion may be greater than an average hardness of the base iron.

In the exemplary embodiment of the present disclosure, after the hot stamping molding, the joint portion may have a microstructure including martensite of 90% by area.

In the exemplary embodiment of the present disclosure, the base iron may further include at least one of niobium (Nb), titanium (Ti), chromium (Cr), molybdenum (Mo), and boron (B).

In the exemplary embodiment of the present disclosure, the coated layer may include a surface layer that is formed on a surface of the base iron and includes aluminum (Al) in an amount of 80 wt % or greater, and an alloy layer that is formed between the surface layer and the base iron, and the alloy layer may include aluminum-iron (Al—Fe) and an aluminum-iron-silicon (Al—Fe—Si) intermetallic compound and includes iron (Fe) in an amount of 20 to 70 wt %.

Another exemplary embodiment of the present disclosure provides a manufacturing method of an aluminum coated blank including arranging edges of a first coated steel sheet and a second coated steel sheet to face each other; and bonding a joint portion that connects the first coated steel sheet to the second coated steel sheet by providing a filler wire at a boundary between the first coated steel sheet and the second coated steel sheet and applying a laser beam, wherein the joint portion is formed by melting the first coated steel sheet, the second coated steel sheet, and the filler wire together by applying the laser beam, each of the first coated steel sheet and the second coated steel sheet includes a base iron and a coated layer that is formed with an adhesion amount of 20 to 100 g/m² on at least one surface of the base iron and includes aluminum, and the joint portion includes aluminum (Al) in an amount greater than or equal to 0.2 wt % and less than or equal to 2.0 wt %, manganese (Mn) in an amount greater than or equal to 0.8 wt % and less than or equal to 2.5 wt %, and carbon (C) in an amount greater than or equal to 0.1 wt % and less than or equal to 0.4 wt %, and ferrite is not formed above a highest Ac3 temperature of the first coated steel sheet and the second coated steel sheet.

In the exemplary embodiment of the present disclosure, the laser beam may be applied to reciprocate across the boundary, and the laser beam may have a frequency of 100 to 1500 Hz, power of 1 to 20 kW, and a formation speed of the joint portion of 15 to 170 mm/sec.

In the exemplary embodiment of the present disclosure, the formation speed of the joint portion is 15 to 120 mm/sec, and a frequency and a radius of the laser beam and the formation speed of the joint portion may satisfy a relationship of following Equation 1

$$\left(\frac{f \times r}{v}\right)^{\alpha} \geq 1 \qquad \text{Equation 1}$$

(In Equation 1, α is 0.7, and f is the frequency (Hz) of the laser beam,
r is the radius (mm) of the laser beam measured from a surface of the aluminum coated steel sheet, and v is the formation speed (mm/sec) of the joint portion).

In the exemplary embodiment of the present disclosure, the base iron may include carbon (C) in an amount of 0.01 to 0.5 wt %, silicon (Si) of 0.01 to 1.0 wt %, manganese (Mn) in an amount of 0.5 to 3.0 wt %, phosphorus (P) in an amount greater than 0 and less than or equal to 0.05 wt %, sulfur (S) in an amount greater than 0 and less than or equal to 0.01 wt %, aluminum (Al) in an amount greater than 0 and less than or equal to 0.1 wt %, nitrogen (N) in an amount greater than 0 and less than or equal to 0.001 wt %, iron (Fe) remnant, and other inevitable impurities, the coated layer may include a surface layer that is formed on a surface of the base iron and includes aluminum (Al) in an amount of 80 wo or greater, and an alloy layer that is formed between the surface layer and the base iron, and the alloy layer may include aluminum-iron (Al—Fe) and an aluminum-iron-silicon (Al—Fe—Si) intermetallic compound and includes iron (Fe) in amount of 20 to 70 wt %.

In the exemplary embodiment of the present disclosure, when the aluminum coated blank is heated to at least Ac3 temperature to perform press molding and is cooled to 300° C. or lower at a cooling rate of 10° C./s to 500° C./s to perform hot stamping molding, the average hardness of the joint portion may be greater than the average hardness of the base iron, and after the hot stamping molding, the joint portion has a microstructure including martensite of 90% by area.

In the exemplary embodiment of the present disclosure, the filler wire may include the manganese (Mn) in an amount greater than or equal to 1.5 wt % and less than or equal to 4.5 wt % and the carbon (C) in an amount greater than or equal to 0.4 wt % and less than or equal to 0.9%, and a difference between a value from multiplication of a first strength and a first thickness of the first coated steel sheet and a value from multiplication of a second strength and a second thickness of the second coated steel sheet may be greater than 500 MPA×mm and less than or equal to 1000 MPA×mm.

In the present disclosure, the filler wire may include the manganese (Mn) in an amount greater than or equal to 2.5 wt % and less than or equal to 4.0 wt % and the carbon (C) in an amount greater than or equal to 0.5 wt % and less than or equal to 0.9%, and a difference between a value from multiplication of a first strength and a first thickness of the first coated steel sheet and a value from multiplication of a second strength and a second thickness of the second coated steel sheet may be less than or equal to 500 MPA×mm.

In the exemplary embodiment of the present disclosure, when the laser beam is applied, at least one of the first coated steel sheet, the second coated steel sheet, and a laser head that emits the laser beam may move.

DETAILED DESCRIPTION

Figure 1:
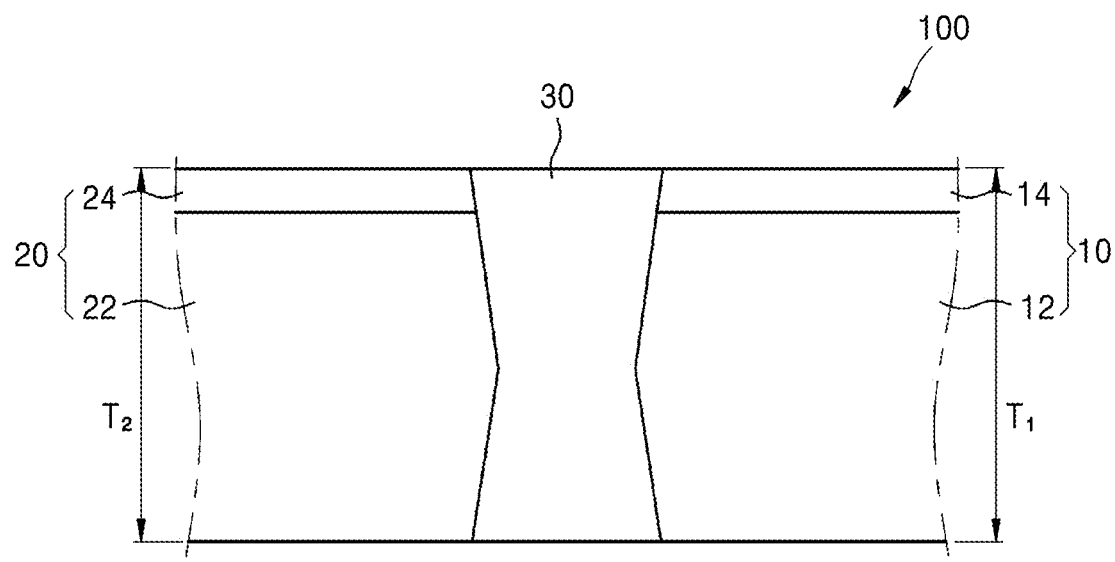
FIG. 1 is a schematic cross-sectional view of an aluminum coated blank according to an exemplary embodiment of the present disclosure.

The present disclosure may be variously changed and have various embodiments, and specific embodiments will be illustrated in the drawings and described in detail in the detailed description. Effects and characteristics of the present disclosure, and a method of achieving the same will be apparent by referring to the embodiments described below in detail together with the drawings. However, the present disclosure is not limited to the embodiments disclosed below and may be implemented in various forms.

In the following embodiments, terms such as "first" and "second" are not used to limit configuration elements but used for the purpose of distinguishing one configuration element from another configuration element.

In the following embodiments, singular expression includes plural expressions unless the context clearly indicates otherwise.

In the following embodiments, terms such as "include" and "have" means that characteristics or configuration elements described in the specification are present, and do not preclude a possibility of adding one or more other characteristics or configuration elements.

In the following exemplary embodiments, when a portion such as a film, a region, or a configuration element is on or above another portion, this includes not only a case in which the portion is directly on another portion, but also a case in which the portion is on another portion through a film, a region, a configuration element, and so on.

In the drawings, configuration elements may be exaggerated or reduced in size for the sake of convenient description. For example, the size and thickness of each configuration element illustrated in the drawing is randomly illustrated for the sake of convenient description, and thus the present disclosure is not limited to what is illustrated.

When a certain embodiment may be implemented in a different form, a specific process sequence may be performed differently from the described sequence. For example, two processes described in succession may be performed substantially at the same time or may also be performed in a sequence opposite to the described sequence.

Hereinafter, embodiments of the present disclosure will be described in detail with reference to the accompanying drawings, and when description is made with reference to the drawings, the same or corresponding configuration elements will be given the same reference numerals.

Figure 2:
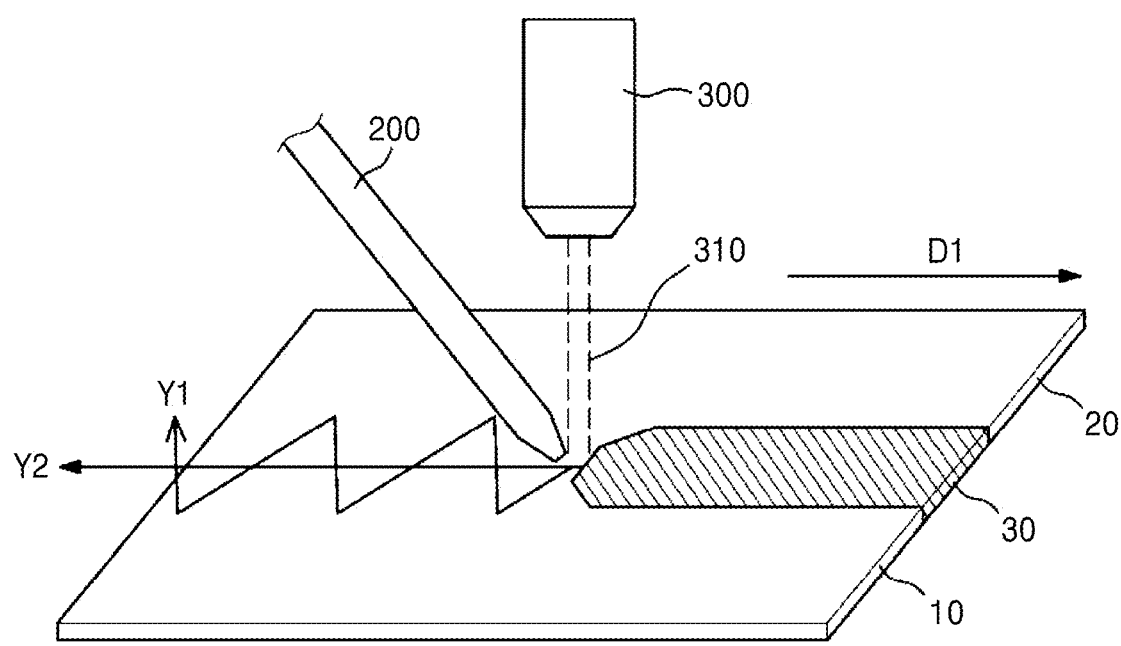
FIGS. 2 and 3 are perspective views schematically illustrating a process of manufacturing an aluminum coated blank according to an exemplary embodiment of the present disclosure.
Figure 3:
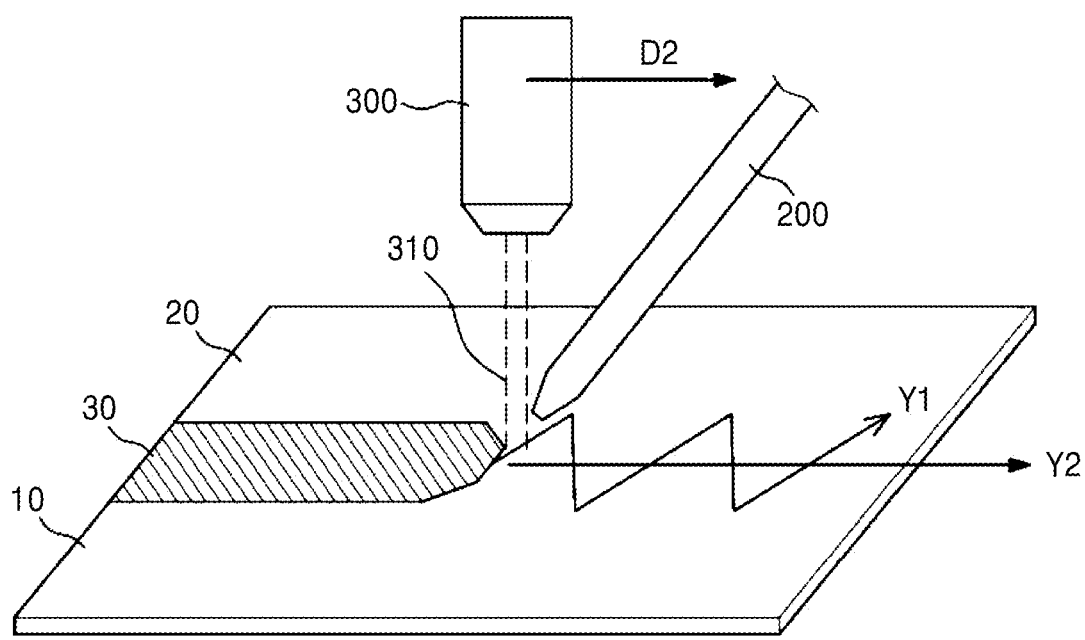
Figure 4:
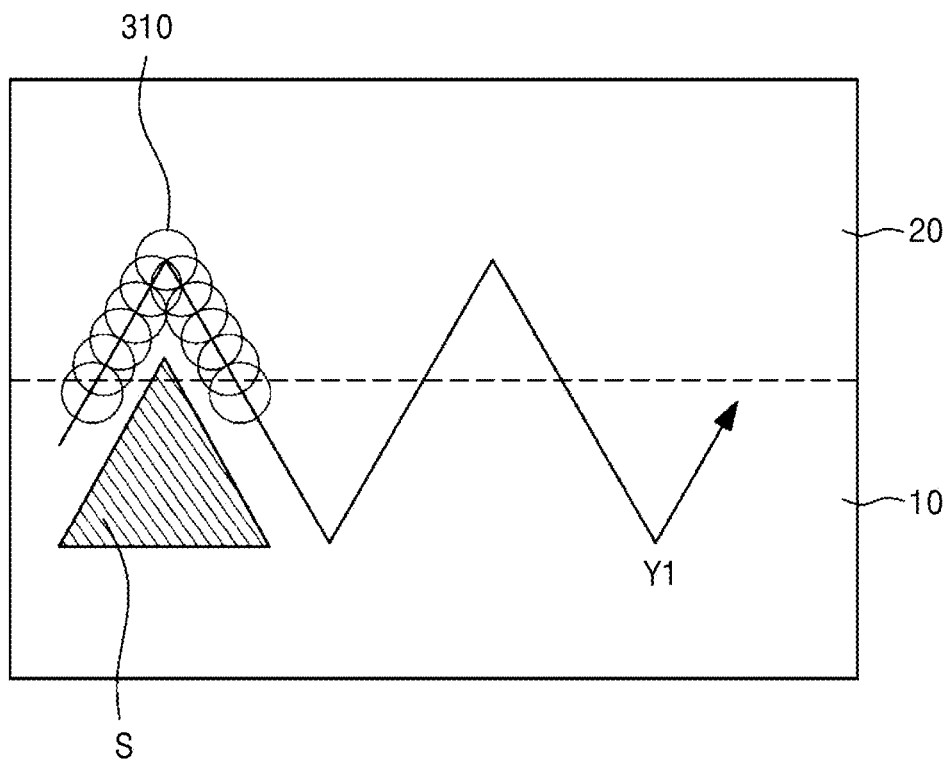
FIG. 4 is a plan view schematically illustrating a process of bonding an aluminum coated steel sheet by irradiating a laser beam.

FIG. 1 is a schematic cross-sectional view of an aluminum coated blank according to an exemplary embodiment of the present disclosure, FIGS. 2 and 3 are perspective views schematically illustrating a process of manufacturing an aluminum coated blank according to an exemplary embodiment of the present disclosure, and FIG. 4 is a plan view schematically illustrating a process of bonding an aluminum coated steel sheet by irradiating a laser beam.

First, referring to FIG. 1, an aluminum coated blank 100 according to an embodiment of the present disclosure may include a first coated steel sheet 10, a second coated steel sheet 20 connected to the first coated steel sheet 10, and a joint portion 30 that connects the first coated steel sheet 10 to the second coated steel sheet 20 at a boundary between the first coated steel sheet 10 and the second coated steel sheet 20.

The first coated steel sheet 10 may include a first base iron 12 and a first coated layer 14 formed on at least one surface of the first base iron 12, and the second coated steel sheet 20 may include a second base iron 22 and a second coated layer 24 formed on at least one surface of the second base iron 22. The first base iron 12 and the second base iron 22 may include the same component, and the first coated layer 14 and the second coated layer 24 may include the same component. Hereinafter, the first base iron 12 and the first coated layer 14 will be described for the sake of convenient description, but the description may be applied to the second base iron 22 and the second coated layer 24.

The first base iron 12 may include carbon (C) in an amount of 0.01 to 0.5 wt %, silicon (Si) in an amount of 0.01 to 1.0 wt %, manganese (Mn) in an amount of 0.5 to 3.0 wt %, phosphorus (P) in an amount greater than 0 and less than or equal to 0.05 wt %, sulfur (S) in an amount greater than 0 and less than or equal to 0.01 wt %, aluminum (Al) in an amount greater than 0 and less than or equal to 0.1 wt %, nitrogen (N) in an amount greater than 0 and less than or equal to 0.001 wt %, a remainder of iron (Fe), and other inevitable impurities.

Carbon (C) is a major element that determines a strength and hardness of steel and is added for the purpose of obtaining a tensile strength of a steel material after a hot stamping (or hot pressing) process. Carbon is also added for the purpose of obtaining hardenability properties. In one specific example, carbon is contained in an amount of 0.01 to 0.5 wt % with respect to the total weight of the first base iron 12. When carbon is contained in an amount less than 0.01 wt %, a mechanical strength of the present disclosure is rarely achieved, and when carbon exceeds 0.5 wt %, a problem of decreasing the toughness of steel or controlling the brittleness of the steel may be caused.

Silicon (Si) acts as a ferrite stabilizing element in the first base iron 12. Silicon performs a function of increasing ductility by purifying ferrite and increasing carbon concentration in austenite by suppressing formation of carbides in a low temperature region. Furthermore, silicon is a key element of hot rolling, cold rolling, hot stamping structure evenness (perlite and manganese segregation control), and ferrite fine dispersion. In one specific example, silicon is contained in an amount of 0.01 to 1.0 wt % with respect to the total weight of the first base iron 12. When silicon is contained in an amount less than 0.01 wt %, the above-described functions may not be sufficiently performed, and when the silicon exceeds 1.0 wt %, hot-rolling and cold-rolling loads may increase, a hot-rolling red scale becomes excessive, and bonding property may decrease.

Manganese (Mn) is added for the purpose of increasing the hardenability and strength during heat treatment. In one specific example, manganese is contained in an amount of 0.5 to 3.0 wt % with respect to the total weight of the first base iron 12. When manganese is contained in an amount less than 0.5 wt %, a material may be insufficient (hard phase fraction is insufficient) after hot stamping due to insufficient hardenability, and when the manganese is contained to exceed 3.0 wt %, ductility and toughness may be reduced by manganese segregation or pearlite bands, bending performance may be decreased, and an uneven microstructure may be generated.

Phosphorus (P) is an element that is well segregated and reduces the toughness of steel. In one specific example, phosphorus (P) is contained in an amount more than 0 and less than or equal to 0.05 wt % with respect to the total weight of the first base iron 12. When phosphorus is contained in the above-described range, a toughness may be prevented from being reduced. When phosphorus is contained in an amount greater than 0.05 wt %, cracks may occur during a process, and an iron phosphide compound may be formed to cause a reduction in toughness.

Sulfur (S) is an element that reduces workability and physical properties. In one specific example, sulfur may be contained in an amount more than 0 and less than or equal to 0.01 wt % with respect to the total weight of the first base iron 12. When sulfur is contained in an amount greater than 0.01 wt %, hot workability may be reduced, and surface defects such as cracks may occur due to generation of large inclusions.

Aluminum (Al) serves as a deoxidizing agent for removing oxygen in the first base iron 12. In one specific example, aluminum is contained in an amount more than 0 and less than or equal to 0.1 wt % with respect to the total weight of the first base iron 12. When content of aluminum exceeds 0.1 wt %, a nozzle clogs during steelmaking, and heat brittleness may occur due to aluminum oxide during casting, resulting in cracks, or ductility may be reduced.

When a large amount of nitrogen (N) is added, the amount of solid solution nitrogen increases, thereby reducing impact characteristics and an elongation rate of the first base iron 12, and significantly reducing the toughness of a joint portion. In one specific example, nitrogen is contained in an amount greater than 0 and less than or equal to 0.001 wt % with respect to the total weight of the first base iron 12. When nitrogen is contained in an amount greater than 0.001 wt %, the impact characteristics and the elongation rate of the first base iron 12 may be reduced, and the toughness of the joint portion may be reduced.

In one specific example, the first base iron 12 may further contain one or more of niobium (Nb), titanium (Ti), chromium (Cr), molybdenum (Mo), and boron (B).

Niobium (Nb) is added for the purpose of increasing a strength and toughness according to a reduction in martensite packet size. In one specific example, niobium may be contained in an amount of 0.005 to 0.1 wt % with respect to the total weight of the first base iron 12. When niobium is contained in the above-described range, an effect of minimizing grains of a steel material in the hot rolling and cold rolling process is excellent, cracks of a slab and brittle fracture of a product may be prevented from occurring during steelmaking and rolling, and generation of coarse steelmaking precipitates may be minimized.

Titanium (Ti) may be added for the purpose of enhancing hardenability by forming precipitates and increasing materials after hot stamping heat treatment. In addition, a precipitated phase such as Ti (C and N) is formed at a high temperature to effectively contribute to miniature of austenite grains. In one specific example, titanium may be contained in an amount of 0.005 to 0.1 wt % with respect to the total weight of the first base iron 12. When titanium is contained in the above-described content range, poor performance and coarsening of precipitates may be prevented, physical properties of steel may be easily obtained, and defects such as cracks on a surface of steel surface may be prevented.

Chromium (Cr) is added for the purpose of increasing the hardenability and strength of the first coated steel sheet 10. In one specific example, chromium may be contained in an amount of 0.01 to 0.5 wt % with respect to the total weight of the first base iron 12. When chromium is contained in the above-described range, the hardenability and strength of the first coated steel sheet 10 may be increased, and an increase in production cost and a decrease in toughness of steel may be prevented.

Molybdenum (Mo) may contribute to an increase in strength by suppressing coarsening of precipitates during hot rolling and hot stamping and by increasing hardenability. Molybdenum (Mo) may be contained in an amount of 0.001 to 0.008 wt % with respect to the total weight of the first base iron 12. When molybdenum is contained in the above-described range, the effects of suppressing coarsening of precipitates during hot rolling and hot stamping and increasing hardenability may be excellent.

Boron (B) is added for the purpose of obtaining hardenability and strength of a steel material by securing a martensite structure and has an effect of grain miniature by increasing an austenite grain growth temperature. In one specific example, boron may be contained in an amount of 0.001 to 0.008 wt % with respect to the total weight of the first base iron 12. When boron is contained in the above-described range, hard phase boundary brittleness may be prevented from being generated and high toughness and bendability may be obtained.

In one embodiment, the first coated steel sheet 10 may be manufactured by including steps of reheating a steel slab containing carbon (C) in an amount of 0.01 to 0.5 wt %, silicon (Si) in an amount of 0.01 to 1.0 wt %, manganese (Mn) in an amount of 0.5 to 3.0 wt %, phosphorus (P) in an amount greater than 0 and less than or equal to 0.05 wt %, sulfur (S) in an amount greater than 0 and less than or equal to 0.01 wt %, aluminum (Al) in an amount greater than 0 and less than or equal to 0.1 wt %, nitrogen (N) in an amount greater than 0 and less than or equal to 0.001 wt %, a remainder of iron (Fe), and other inevitable impurities, finishing rolling of the reheated slab; winding the hot-rolled steel sheet; cold-rolling the wound steel sheet; annealing the cold-rolled steel sheet; and forming the first coated layer 14 on a surface of the annealed steel sheet.

The first coated layer 14 formed on at least one surface of the first base iron 12 may be formed with an adhesion amount of 20 to 100 g/m$^2$ per plane surface. In addition, the first coated layer 14 includes aluminum (Al). In one specific example, the first coated layer 14 may be formed by including steps of immersing the first base iron 12 in a coating bath including at least one of melted aluminum of 600 to 800° C. and an aluminum alloy, and cooling the first base iron at a cooling rate of average 1 to 50° C.

In one specific example, after the first base iron 12 is immersed in the coating bath, at least one of air and gas is sprayed onto a surface of the first base iron 12 to wipe the melted coated layer, a spray pressure is controlled, and thus, a coating amount of the first coated layer 14 may be adjusted.

The coating amount may be formed in a range of 20 to 150 g/m$^2$ on at least one surface of the first base iron 12. Preferably, the coating amount is formed in a range of 20 to 100 g/m$^2$ on at least one surface of the first base iron 12. When the coating amount is less than 20 g/m$^2$, corrosion resistance may be reduced, and when the coating amount exceeds 100 g/m², the amount of aluminum (Al) introduced into the joint portion 30 is increased when the first coated steel sheet 10 is bonded to the second coated steel sheet 20, and thus, a strength of the joint portion 30 may be reduced after hot stamping.

In one specific example, the first coated layer 14 may include a surface layer that is formed on a surface of the first base iron 12 and contains aluminum (Al) in an amount of 80 wt % or greater, and an alloy layer that is formed between the surface layer and the first base iron 12, contains an aluminum-iron (Al—Fe) and an aluminum-iron-silicon (Al—Fe—Si) intermetallic compound, and contains iron (Fe) in an amount of 20 to 70 wt %.

In one specific example, the surface layer may contain aluminum of 80 to 100 wt % and may have an average thickness of 10 to 40 µm. When an average thickness of the surface layer is less than 10 µm, the corrosion resistance of the first aluminum coated blank 10 is reduced, and when the average thickness of the surface layer exceeds 40 µm, the amount of aluminum (Al) introduced into the joint portion 30 when the first aluminum coated blank 10 is bonded to the second aluminum coated blank 20 is increased to reduce mechanical properties of the joint portion 30 after hot stamping. For example, the average thickness of the surface layer may be 10 to 30 µm.

In one specific example, the alloy layer may contain iron (Fe) in an amount of 20 to 70 wt %. Under the above conditions, the alloy layer has a high melting point so that the surface layer is melted in a hot stamping furnace, and thus, it is possible to prevent a liquid metal embrittlement phenomenon that liquid penetrates into a structure of the first base iron 12. For example, the alloy layer may contain iron (Fe) in an amount of 20 to 60 wt %.

The joint portion 30 is formed by aligning a side surface of the first coated steel plate 10 with a side surface of the second coated steel plate 20 to face each other, providing the filler wire 200 to a boundary between the first coated steel plate 10 and the second coated steel plate 20, and applying a laser beam to melt the first coated steel plate 10, the second coated steel plate 20, and the filler wire 200, and the formed joint portion 30 may be made of a composition in which ferrite is not formed at a higher Ac3 temperature of an Ac3 temperature of the first coated steel plate 10 and an Ac3 temperature of the second coated steel plate 20. Preferably, the joint portion 30 may be composed of a composition in which ferrite is not formed at 850° C. or higher. Specifically, the joint portion 30 subjected to a hot stamping process, that is, the joint portion 30 subjected to a hot stamping process in which the aluminum coated blank 100 is heated to 850 to 1000° C., is press-molded, and then is rapidly cooled at an average cooling rate of 10 to 500° C./s is made of a composition capable of having a microstructure including martensite having an area fraction of 90% or greater. For example, at a hot stamping heating temperature, the joint portion 30 may exist as a full austenite structure, and then may be transformed into a martensitic structure having an area fraction of 90% or greater upon cooling, preferably a full martensitic structure.

The joint portion 30 contains aluminum (Al) in an amount of 0.2 to 2.0 wt %. The content of aluminum may be the sum of aluminum (Al) introduced from the first coated steel sheet 10, the second coated steel sheet 20, and a filler wire 200, which are melted. When the content of aluminum (Al) of the joint portion 30 is less than 0.2 wt %, the first and second coated layers 14 and 24 have to be removed for adjusting the amount of aluminum (Al) introduced thereinto when the first coated steel sheet 10 is bonded to the second coated steel sheet 20, and thus, the efficiency of the manufacturing process is reduced. Meanwhile, when the content of aluminum (Al) of the joint portion 30 exceeds 2.0 wt %, a fraction of the martensite of the joint portion is reduced after hot stamping, and thus, mechanical properties of the aluminum coated blank 100 are reduced. Meanwhile, when the joint portion 30 contains aluminum in an amount greater than 1.0 wt %, there is a possibility that an oxide film may be formed on a surface of the joint portion 30, and thus, the joint portion 30 may contain aluminum in an amount of 0.2 to 1.0 wt % to remove the possibility. In addition, the joint portion 30 may contain more austenite stabilizing elements than the first and second base irons 12 and 22. For example, the joint portion 30 may contain carbon (C) in an amount greater than or equal to 0.1 wt % and less than or equal to 0.4 wt % and manganese (Mn) in an amount greater than or equal to 0.8 wt % and less than or equal to 2.5 wt %.

Content of carbon (C) contained in the joint portion 30 may be the sum of carbon (C) introduced from the first coated steel sheet 10, the second coated steel sheet 20, and the filler wire 200, which are melted. When the content of carbon (C) of the joint portion 30 is less than 0.1 wt %, the hardness of the joint portion 30 is less than the hardness of the first coated steel sheet 10 and the second coated steel sheet 20, and thus, the joint portion 30 may be fractured. Meanwhile, when the content of carbon (C) exceeds 0.4 wt %, the hardness of the joint portion 30 may increase excessively, and thus, brittle fracture may occur in the joint portion 30 due to external impact or so on.

The content of manganese (M) contained in the joint portion 30 may be the sum of manganese (M) introduced from the first coated steel sheet 10, the second coated steel sheet 20, and the filler wire 200, which are melted. When the content of manganese (M) of the joint portion 30 is less than 0.8 wt %, a ferrite structure may coexist in the joint portion 30 during hot stamping, and when the content of manganese (M) exceeds 2.5 wt %, the quality of the joint portion 30 may be reduced and cracks may occur in the joint portion 30 due to a decrease in viscosity at the time of melting of the joint portion 30 and expansion of an expansion coefficient at the time of transformation into a solid phase.

Meanwhile, the average hardness of the first coated steel sheet 10 and the average hardness of the second coated steel sheet 20 may be different from each other. In addition, the average hardness of the joint portion 30 may be greater than the average hardness of the first coated steel sheet 10 and the average hardness of the second coated steel sheet 20. For example, a minimum hardness value of the joint portion 30 may be greater than a largest hardness value among hardness values of the first coated steel sheet 10 and the second coated steel sheet 20.

In addition, when the aluminum coated blank 100 is heated to Ac3 or higher to be press-molded and then cooled to 300° C. or lower at a cooling rate of 10 to 500° C./s to be hot-stamped, the average hardness of the joint portion 30 may be greater than the average hardness values of the first and second base irons 12 and 22.

The first coated steel sheet 10 and the second coated steel sheet 20 may be different from each other in at least one of strength and thickness. In this case, when the first coated steel sheet 10 and the second coated steel sheet 20 are bonded to each other, the amount of components introduced into the joint portion 30 from the first coated layer 14 and the second coated layer 24 may be changed depending on strengths and thicknesses of the first coated steel sheet 10 and the second coated steel sheet 20. Meanwhile, the filler wire 200 may have different content of the components by considering components introduced from the first coated steel sheet 14 and the second coated layer 24 to prevent ferrite from being formed in the joint portion 30 above the Ac3 temperature when the first coated steel sheet 10 is bonded to the second coated steel sheet 20, and as a result, content of the austenite stabilizing element contained in the joint portion 30 may vary.

For example, in a case where the first coated steel sheet 10 has a first thickness T1 and a first strength, and in a case where the second coated steel sheet 20 has a second thickness T2 and a second strength, when a difference between the value from multiplication of the first strength and the first thickness T1 and the value from multiplication of the second strength and the second thickness T2 is 500 MPA×mm or less, the joint portion 30 may contain carbon (C) in an amount greater than or equal to 0.25 wt % and less than or equal to 0.4 wt %, and manganese (Mn) in an amount greater than or equal to 1.5 wt % and less than or equal to 2.5 wt %.

In addition, when the difference between the value from multiplication of the first strength and the first thickness T1 and the value from multiplication of the second strength and the second thickness T2 is greater than 500 MPA×mm and less than or equal to 1000 MPA×mm, the joint portion 30 may contain carbon (C) in an amount greater than or equal to 0.2 wt % and less than or equal to 0.3 wt % and manganese (Mn) in an amount greater than or equal to 1.0 wt % and less than or equal to 2.0 wt %.

When the difference between the value from multiplication of the first strength and the first thickness T1 and the value from multiplication of the second strength and the second thickness T2 is greater than 1000 MPA×mm, the joint portion 30 may contain carbon (C) in an amount greater than or equal to 0.1 wt % and less than or equal to 0.25 wt % and manganese (Mn) in an amount greater than or equal to 0.8 wt % and less than or equal to 1.5 wt %.

That is, as the difference between the value from multiplication of the first strength and the first thickness T1 and the value from multiplication of the second strength and the second thickness T2 is increased, content of carbon (C) and manganese (Mn) contained in the joint portion 30 may increase, and when satisfying the above range, the joint portion 30 may exist as a full austenite structure at the hot stamping heating temperature, and then may be transformed into a martensitic structure having an area fraction of 90% or greater upon cooling, preferably a full martensite structure.

Meanwhile, the aluminum coated blank 100 described above may be heated to a temperature of Ac3 or higher, press-molded, and cooled to a temperature of 300° C. or lower at an average cooling rate of 10 to 500° C./s to form a hot stamping member, and portions of the formed hot stamping member, corresponding to the first and second coated steel sheets 10 and 20 and the joint portion 30 is higher than the first and second coated steel sheets 10 and 20 and the joint portion of the aluminum coated blank 100 in tensile strength. Particularly, the joint portion 30 of the aluminum coated blank 100 may have a microstructure including martensite having an area fraction of 90% or greater.

Hereinafter, a manufacturing method of an aluminum coated blank will be described with reference to FIGS. 2 and 3.

The manufacturing method of the aluminum coated blank 100 according to an exemplary embodiment of the present disclosure may include a step of arranging edges of the first coated steel sheet 10 and the second coated steel sheet 20 to face each other, and a bonding step of forming the joint portion 30 by connecting the first coated steel sheet 10 to the second coated steel sheet 20 by providing the filler wire 200 at a boundary between the first coated steel sheet 10 and the second coated steel sheet 20 and irradiating the first coated steel sheet 10 and the second coated steel sheet 20 with a laser beam 310, A side surface of the first coated steel sheet 10 and a side surface of the second coated steel sheet 20 are arranged to face each other. In this case, the side surface of the first coated steel sheet 10 and the side surface of the second coated steel sheet 20 may be in contact with each other.

The filler wire 200 is provided at the boundary between the first coated steel sheet 10 and the second coated steel sheet 20, and by irradiating the boundary with the laser beam 310 emitted from a laser head 300, the joint portion 30 connecting the first coated steel sheet 10 to the second coated steel sheet 20 is formed at the boundary between the first coated steel sheet 10 and the second coated steel sheet 20.

The joint point 30 is formed by melting the first coated steel sheet 10, the second coated steel sheet 20, and the filler wire 200 by using the laser beam 310, and through this process, components of the first coated layer 14 of the first coated steel sheet 10 and the second coated layer 24 of the second coated steel sheet 20 are introduced into the joint portion 30. Thus, the composition of the filler wire 200 has to be determined by considering introduction of components of the first coated layer 14 and the second coated layer 24 during laser welding.

In one specific example, the filler wire 200 may contain an austenite stabilizing element. For example, the austenite stabilizing element may include at least one of carbon (C) and manganese (Mn). The filler wire 200 may be introduced into the joint portion 30 in a molten state to adjust a composition of the joint portion 30.

Specifically, even when aluminum (Al) of the first coated layer 14 and the second coated layer 24 is introduced into a melted pool of the joint portion 30, the microstructure of the joint portion 30 is hot-stamped by the austenite stabilizing element added to the filler wire 200, and then the joint portion 30 may have a martensite structure having an area fraction of 90% or greater, preferably a full martensite structure. That is, according to the present disclosure, even when the components of the first coated layer 14 and the second coated layer 24 are introduced into the joint portion 30 without removing the first coated layer 14 and the second coated layer 24, the hardness and strength of the joint portion 30 may be prevented from being reduced, and thus, the joint portion 30 may be prevented from being fractured.

Meanwhile, the first coated steel sheet 10 and the second coated steel sheet 20 may be different from each other in at least one of strength and thickness. In this case, when the first coated steel sheet 10 and the second coated steel sheet 20 are bonded to each other, the amount of the components introduced into the joint portion 30 from the first coated layer 14 and the second coated layer 24 may be changed depending on strengths and thicknesses of the first coated steel sheet 10 and the second coated steel sheet 20. In this case, the content of carbon (C) and manganese (Mn) contained in the filler wire 200 may be changed depending on the strengths and thicknesses of the first coated steel sheet 10 and the second coated steel sheet 20.

For example, in a case where the first coated steel sheet 10 has a first thickness T1 and a first strength, and in a case where the second coated steel sheet 20 has a second thickness T2 and a second strength, when a difference between the value from multiplication of the first strength and the first thickness T1 and the value from multiplication of the second strength and the second thickness T2 is 500 MPA×mm or less, the filler wire 200 may contain carbon (C) in an amount greater than or equal to 0.5 wt % and less than or equal to 0.9 wt %, and manganese (Mn) in an amount greater than or equal to 2.5 wt % and less than or equal to 4.5 wt %.

In addition, when the difference between the value from multiplication of the first strength and the first thickness T1 and the value from multiplication of the second strength and the second thickness T2 is greater than 500 MPA×mm and less than or equal to 1000 MPA×mm, the filler wire 200 may contain carbon (C) in an amount greater than or equal to 0.4 wt % and less than or equal to 0.9 wt % and manganese (Mn) in an amount greater than or equal to 1.5 wt % and less than or equal to 4.5 wt %.

In addition, when the difference between the value from multiplication of the first strength and the first thickness T1 and the value from multiplication of the second strength and the second thickness T2 is greater than 1000 MPA×mm, the filler wire 200 may contain carbon (C) in an amount greater than or equal to 0.3 wt % and less than or equal to 0.9 wt % and manganese (Mn) in an amount greater than or equal to 0.3 wt % and less than or equal to 4.5 wt %.

As described above, content of carbon (C) and manganese (M) contained in the filler wire 200 is contained different from each other according to the difference between the value from multiplication of strengths and thicknesses of the first coated steel sheet 10 and the second coated steel sheet 20, and thus, the content of carbon (C) and manganese (M) contained in the joint portion 30 may be adjusted, and as a result, the joint portion 30 may exist as a full austenite structure at the hot stamping heating temperature and may be transformed into a martensitic structure having an area fraction of 90% or greater upon cooling, preferably a full martensite structure.

Meanwhile, even when the introduced components of the first and second coated layers 14 and 24 are diluted by the filler wire 200, the components of the filler wire 200 and the first and second coated layers 14 and 24 may not be evenly distributed in the components of the first and second base irons 12 and 22 depending on bonding conditions. In order to prevent this, when the first and second coated steel sheets 10 and 20 are bonded to each other, the laser beam 310 may be applied to form a pattern at a predetermined angle based on a formation direction of the joint portion 30.

In one specific example, the pattern may be formed by moving at least one of the first and second coated steel sheets 10 and 20 and the laser head 300 when the laser beam 310 is applied.

For example, the laser beam 310 performs a pattern movement in a predetermined angle with a direction in which the joint portion 30 is formed, and the filler wire 200 and the first and second coated steel sheets 10 and 20 may be melted to form the joint portion 30.

In addition, the joint portion 30 may be formed by moving at least one of the first and second coated steel sheets 10 and 20 and the laser head 300 while the laser beam 310 performs a pattern movement to be applied. In the present specification, a "relative movement" means that at least one of the first and second coated steel sheets 10 and 20 and the laser head 300 moves. Preferably, the first and second coated steel sheets 10 and 20 are stopped and the laser head 300 moves to form the joint portion 30.

As an example, FIG. 2 schematically illustrates a process in which the first and second coated steel sheets 10 and 20 perform a pattern movement to form the joint portion 30.

Referring to FIG. 2, the laser head 300 emits the laser beam 310 in a fixed state, and the filler wire 200 is supplied toward a portion in which the first and second coated steel sheets 10 and 20 face each other. Meanwhile, the first and second coated steel sheets 10 and 20 move in parallel in a direction D1 opposite to a direction Y2 in which the joint portion 30 is formed and performs a pattern movement at the same time so that a movement path Y1 of the laser beam 310 forms a predetermined angle with a direction Y2 in which the joint portion 30 is formed, and the laser beam 310 may be applied thereto to form the joint portion 30.

As another example, FIG. 3 schematically illustrates a process of forming the joint portion 30 while the laser head 300 moves. Referring to FIG. 3, the first and second coated steel sheets 10 and 20 may be fixed, the filler wire 200 may be supplied toward the portion in which the aluminum coated steel sheets 10 and 20 face each other, and the laser head 300 moves to emit the laser beam 310. In this case, the laser head 300 moves in parallel in the direction D2 which is the same as the direction Y2 in which the joint portion 30 is formed and performs a pattern movement at the same time so that the movement path Y1 of the laser beam 310 forms a predetermined angle with the direction Y2 in which the joint portion 30 is formed, and the laser beam 310 may be applied thereto to form the joint portion 30. The laser beam 310 may perform a pattern movement in a direction higher than or equal to 45 degrees and lower than or equal to 90 degrees with respect to the direction Y2 in which the joint portion is formed.

In FIG. 3, the laser beam 310 may move in a direction different from the movement direction D2 of the laser head 300. Preferably, the movement direction of the laser beam 310 may form a certain angle with the movement direction D2 of the laser head 300.

As an example, the movement direction of the laser beam 310 may be a direction perpendicular to the movement direction D2 of the laser head 300. As an alternative embodiment, the laser beam 310 may perform a pattern movement at an angle lower than or equal to 45 degrees and less than or equal to 90 degrees with respect to the movement direction D2 of the laser head 300.

As a result, the laser beam 310 may be applied while performing a pattern movement having a predetermined angle with the direction Y2 in which the joint portion is formed. Therefore, a movement length of the laser beam 310 on surfaces of the first and second coated steel sheets 10 and 20 increases compared to a case in which the laser beam 310 is applied in the same direction as the direction Y2 in which the joint portion is formed, areas of the first and second coated steel sheets 10 and 20 to which energy of the laser beam 310 is delivered are increased, the areas to which energy is delivered may also overlap each other according to the movement path Y1 of the laser beam 310 and a magnitude of a radius of the laser beam 310, and components of the first and second coated layers 14 and 24 and components of the filler wire 200 may be sufficiently diluted in components of the first and second base irons 12 and 22 to form the joint portion 30.

In one specific example, the laser beam 310 may have a frequency of 100 to 1500 Hz and power of 1 to 20 kW. In one specific example, the power of the laser beam 310 may indicate an output value of a laser oscillation unit, and the frequency of the laser beam 310 may indicate a frequency of a pattern movement of the laser beam 310.

In one specific example, when the aluminum coated blank 100 is manufactured, a formation speed of the joint portion 30 has to be 1 m/min or greater, a laser frequency has to be 1500 Hz or less, and power of the laser beam 310 has to be 20 kW or less so that minimum productivity and business feasibility may be obtained. The higher the laser frequency and power of the laser beam 310, the better, but a high-performance facility is required to obtain a frequency exceeding 1500 Hz and power exceeding 20 kW, and thus, there is a problem that a size of facility increases and cost of facility increases. In addition, it is necessary to maintain the formation speed of the joint portion 30 at 1 m/min or greater to obtain minimum productivity. A formation speed of the joint portion 30 indicates a displacement per unit time in which the laser head 300 moves relative to and in parallel with the direction Y2 in which the joint portion is formed.

In one specific example, the formation speed of the joint portion 30 may be 1 to 10 m/min. In a case in which the formation speed of the joint portion 30 exceeds 10 m/min, even when the laser beam 310 is applied with a frequency of 100 to 1500 Hz, power of 1 to 20 kW, and a beam radius condition of 0.1 to 1.0 mm, an angle between the movement path Y1 of the laser beam 310 and the direction Y2 in which the joint portion 30 is formed is increased, and thus, there may be a portion in which components of the first and second coated layers 14 and 24 are not sufficiently diluted in components of the first and second base irons 12 and 22, when the first and second coated layers 14 and 24 and the first and second coated layers 14 and 24 are melted by the laser beam 310.

In one specific example, the formation speed of formation of the joint portion 30 is 15 to 170 mm/sec. Preferably, the formation speed may be 1 to 7 m/min. Preferably, the formation speed of the joint portion 30 may be 15 to 120 mm/sec.

In one specific example, a radius of the laser beam 310 may be 0.1 to 1.0 mm. In order for the radius of the laser beam 310 to exceed 1.0 mm, distances between the filler wire 200, the first and second coated steel sheets 10 and 20, and the laser head 300 have to be close to each other, and in this case, a space to which the filler wire 200 is supplied, or a space to be replaced when the filler wire 200 is consumed is not sufficient, and thus, efficiency of a manufacturing process may be reduced. Meanwhile, when a radius of the laser beam 310 is less than 0.1 mm, a region S to which the laser beam 310 is not applied may exist as illustrated in FIG. 4. Referring to FIG. 4, in a case in which a radius of the laser beam radius is less than 0.1 mm, even when the laser beam is applied under conditions of a frequency of 100 to 1500 Hz and power of 1 to 20 kW, there may be the region S to which the laser beam 310 is not applied because a radius of a laser beam is small.

Meanwhile, when a frequency of the laser beam 310 is less than 100 Hz, an interval between spots of the laser beam 310 is increased, and thus, even when a laser beam having power of 1 to 20 kW, the laser beam 310 having a radius of 0.1 to 1.0 mm, and the joint portion 30 having a formation speed of 1 to 7 m/min are obtained, there may be a portion in which components of the first and second coated layers 14 and 24 are not sufficiently diluted in components of the first and second base irons 12 and 22 when the laser beam 310 is applied.

In addition, in a case in which power of the laser beam 310 is less than 1 kW, even when a laser beam having a frequency of 100 to 1500 Hz, the laser beam 310 having a radius of 0.1 to 1.0 mm, and the joint portion 30 having a formation speed of 1 to 7 m/min are obtained, there may be a portion in which components of the first and second coated layers 14 and 24 are not sufficiently diluted in components of the first and second base irons 12 and 22 when the laser beam 310 is applied, because energy delivered to the first and second coated steel sheets 10 and 20 is insufficient.

As an alternative embodiment, when the laser beam 310 is irradiated, a first laser beam and a second laser beam spaced apart from each other may be applied. For example, the first laser beam melts the filler wire 200, the first and second coated layers 14 and 24, and the first and second base irons 12 and 22, and the melted state is maintained with the second laser beam to perform uniform agitation of the melted portion, and thus, the joint portion 30 may be prevented from being separated, and quality and mechanical properties may be excellent. Meanwhile, when the first laser beam and the second laser beam are used, the sum of powers of the first laser beam and the second laser beam may be 1 to 20 kW.

Meanwhile, when the aluminum coated blank 100 is bonded within the above-described range of power, radius, and frequency of the laser beam and formation speed of the joint portion 30, is heated to a high temperature, and is rapidly cooled, the average hardness of the joint portion 30 may be greater than or equal to the average hardness of the first and second coated steel sheets 10 and 20, and preferably, the minimum hardness of the joint portion 30 may be greater than or equal to the average hardness of the first and second coated steel sheets 10 and 20. In a case in which the average hardness of the joint portion 30 is less than the average hardness of the first and second coated steel sheets 10 and 20, when tensile force is applied to the heat-treated blank 100, the joint portion 30 may be fractured. In one specific example, when the aluminum coated blank 100 is heated to Ac3 or higher to be press-molded, and then cooled to 300° C. or lower at a cooling rate of 10 to 500° C./s to be hot-stamped, the average hardness of the joint portion 30 may be greater than or equal to the average hardness of the first and second coated steel sheets 10 and 20.

In one specific example, a formation speed of the joint portion 30 may be 15 to 120 mm/sec, and a frequency of the laser beam 310, a radius of the laser beam 310, and the formation speed of the joint portion 30 may be satisfied by following Equation 1.

$$\left(\frac{f \times r}{v}\right)^{\alpha} \geq 1 \qquad \text{[Equation 1]}$$

(In Equation 1, a is 0.7, f is a frequency (Hz) of the laser beam, r is a radius (mm) of the laser beam measured on a surface of the aluminum coated steel sheet, and v is a formation speed (mm/sec) of the joint portion).

Even when the frequency, power, and radius of the laser beam 310 and the formation speed of the joint portion 310 in Equation 1 are controlled, an area fraction of aluminum (Al) segregation has to be lowered to obtain a sufficient tensile strength of the joint portion 30. To do so, many variables, such as frequency, power, and radius of the laser beam 310, a formation speed of the joint portion 30, energy loss generated as the laser beam 310 is applied from the laser head 300 to the first and second plated steel sheets 10 and 20, the heat reflectance of the first and second coated layers 14 and 24, the thermal conductivity of the first and second coated steel sheets 10 and 20, the thicknesses of the first and second base irons 12 and 22, and the thicknesses of the first and second coated layers 14 and 24, have to be considered.

In addition, there is a difficulty in that, when a radius of the laser beam 310 is controlled, energy has to be evenly delivered to the joint portion 30 by considering not only energy density on surfaces of the first and second coated steel sheets 10 and 20 but also a movement path of the laser beam 310 on the surfaces of the first and second coated steel sheets 10 and 20 determined according to the frequency of the laser beam 310 and the formation speed of the joint portion 300.

Accordingly, the inventor of the present disclosure derived a condition to obtain a sufficient tensile strength of the joint portion 30 only with a frequency and a radius of the laser beam 310 and a formation speed of the joint portion 30 by using a correction factor α obtained by considering various situations described above through excessively repeated experiments.

When the condition according to Equation 1 is satisfied, a segregation fraction of aluminum (Al) may be reduced to 5% or less. However, in this case, the formation speed of the joint portion 30 is preferably 1 to 7 m/min, and more preferably 15 to 120 mm/sec. When the formation speed of the joint portion 30 is high, there is a problem that the time for evenly delivering energy to the joint portion 30 is not sufficient. For example, even when Equation 1 is satisfied under the condition of the formation speed of the joint portion 30 of 120 to 170 mm/s, Al segregation of the joint portion may be excessively generated.

Meanwhile, even when the area fraction of aluminum (Al) segregation of the joint portion 30 is satisfied at 5% or less, in a case in which aluminum (Al) segregation occurs at a boundary surface between the joint portion 30 and the first and second base irons 12 and 22, there is a high possibility that the joint portion 30 may be fractured, specifically at the boundary surface between the joint portion 30 and the first and second coated steel sheets 10 and 20.

In one specific example, when a pattern angle of the laser beam 310 is greater than or equal to 45 degrees and less than or equal to 90 degrees, the aluminum (Al) segregation may be prevented from being formed at the boundary surface between the joint portion 30 and the first and second coated steel sheets 10 and 20. The pattern angle indicates an angle that the direction Y2 in which the joint portion 30 is formed and the movement path Y1 of the laser beam forms on surfaces of the first and second coated steel sheets 10 and 20 when the joint portion 30 is formed.

Figure 5:
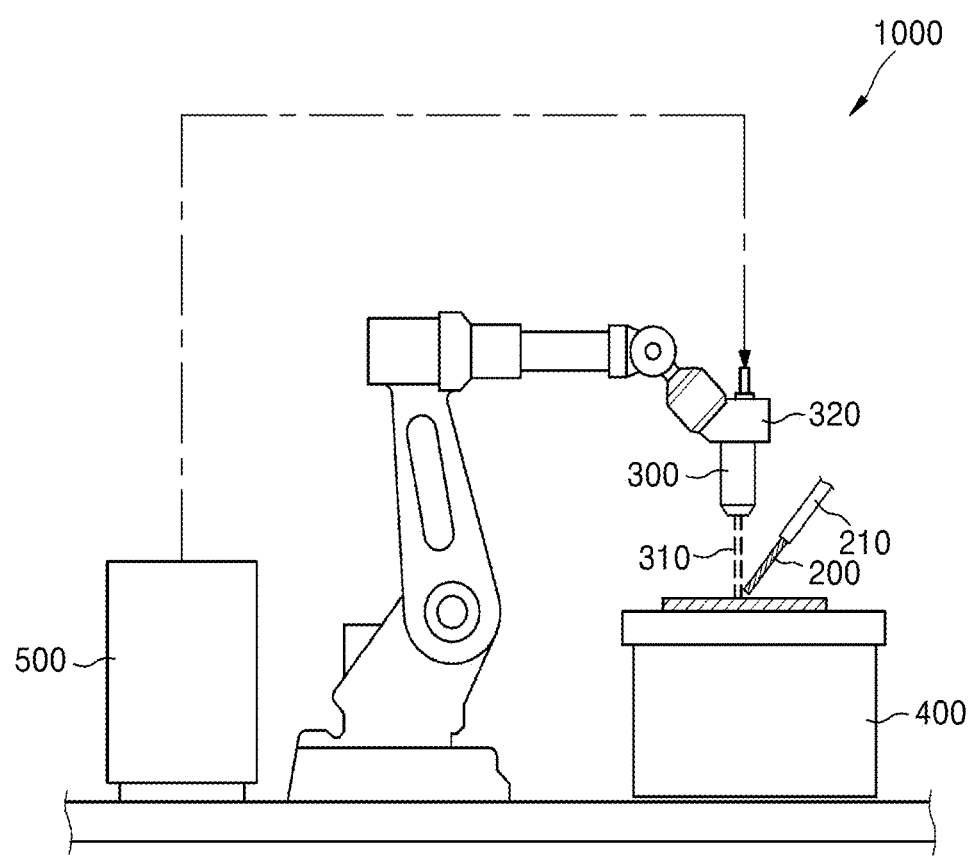
FIG. 5 is a cross-sectional view schematically illustrating an aluminum blank manufacturing apparatus according to an exemplary embodiment of the present disclosure.

FIG. 5 is a cross-sectional view schematically illustrating an aluminum coated blank manufacturing apparatus according to an exemplary embodiment of the present disclosure.

Referring to FIG. 5, an aluminum coated blank manufacturing apparatus 1000 includes a laser oscillation unit 500 that generates a laser light source, a steel sheet loading unit 400 in which two or more aluminum coated steel sheets are arranged and an edge of one coated steel sheet and the other coated steel sheet are arranged to face each other, a wire supply unit 210 that supplies the filler wire 200 for forming a joint portion of the coated steel sheets, and a laser head 300 that emits a laser beam onto a portion in which the aluminum coated steel sheets face each other and the supplied filler wire by using a laser light source supplied from the laser oscillation unit 500.

In one specific example, the laser head 300 may be fastened to a robot arm 320 to move in a direction opposite to a direction in which the joint portion is formed.

In one specific example, the aluminum coated steel sheets may be moved in the same direction as the direction in which the joint portion is formed by using the steel sheet loading unit 400.

When bonding the steel sheets, the steel sheets are bonded by applying a laser beam so that a pattern of a predetermined angle is formed based on a formation direction of the joint portion, and the laser beam has a frequency of 100 to 1500 Hz and power of 1 to 20 kW. A formation speed of the joint portion may be 1 to 10 m/min, preferably 15 to 170 mm/sec.

The aluminum coated steel sheets may be the first and second coated steel sheets 10 and 20 of FIG. 1 described above.

In one specific example, the pattern may be formed as at least one of the coated steel sheet of the steel sheet loading unit and the laser beam performs a pattern movement.

Hereinafter, a configuration and operation of the present disclosure will be described in more detail through embodiments of the present disclosure. However, the embodiment is presented as an example of the present disclosure and may not be construed as limiting the present disclosure in any sense.

Embodiments and Comparative Examples

Embodiment 1

Two or more aluminum coated steel sheets having different strengths and thicknesses were prepared, each including a base iron containing carbon (C) in an amount of 0.01 to 0.5 wt %, silicon (Si) in an amount of 0.01 to 1.0 wt %, manganese (Mn) in an amount of 0.5 to 3.0 wt %, phosphorus (P) in an amount greater than 0 and less than or equal to 0.05 wt %, sulfur (S) in an amount greater than 0 and less than or equal to 0.01 wt %, aluminum (Al) in an amount greater than 0 and less than or equal to 0.1 wt %, nitrogen (N) in an amount greater than 0 and less than or equal to 0.001 wt %, a remainder of iron (Fe), and other inevitable impurities; and a coated layer that is formed on at least one surface of the base iron with an adhesion amount of 20 to 100 g/m$^2$ and containing aluminum (Al). The coated layer of the aluminum coated steel sheet included a surface layer that was formed on a surface of the base iron and contains aluminum (Al) in an amount of 80 wt % or greater; and an alloy layer that was formed between the surface layer and the base iron, contained aluminum-iron (Al—Fe) and an aluminum-iron-silicon (Al—Fe—Si) intermetallic compound, and contained iron (Fe) in an amount of 20 to 70 wt %.

In addition, an edge of one of the two or more aluminum coated steel sheets and an edge of another aluminum coated steel plate were arranged to face each other on the steel sheet loading unit of the aluminum coated blank manufacturing apparatus illustrated in FIG. 5. Then, a filler wire was provided from the wire supply unit to a portion in which the aluminum coated steel sheets faced each other, a laser beam was applied to melt the portion in which the aluminum coated steel sheets faced each other and the filler wire so that a joint portion was formed, and thus, an aluminum coated blank was manufactured.

When bonding the steel sheets, a laser beam was applied to form a pattern of a predetermined angle based on a direction in which the joint portion was formed, and thus, the steel sheets were bonded to each other. Specifically, while the laser head moved in parallel with a direction identical to the direction in which the joint portion was formed, the laser beam was applied irradiated while performing a pattern movement at 60 degrees with respect to the direction in which the joint portion was formed. In addition, the laser beam was applied with a frequency of 100 Hz, beam power of 1 kW, and a beam radius of 0.1 mm, and the joint portion was formed at a forming speed of 1 m/min.

Following Table 1 shows a difference between multiplication values of the strengths and thicknesses of the two coated steel sheets connected by the joint portion and is a result of determination of the joint portion when testing tension of the aluminum coated blank according to content of carbon (C) and manganese (M) contained in the filler wire.

TABLE 1

| difference between multiplication values of strengths and thicknesses of two coated steel sheets (MPA × mm) | Carbon (C) (wt %) | Manganese (M) (wt %) | Whether or not there is fracture in joint portion |
|---|---|---|---|
| 450 | 0.2 | 0.3 | o |
| 450 | 0.3 | 0.3 | o |
| 450 | 0.4 | 1.0 | o |
| 450 | 0.5 | 2.0 | o |
| 450 | 0.8 | 4.0 | x |
| 450 | 0.9 | 4.5 | x |
| 450 | 1.0 | 4.5 | o |
| 450 | 0.2 | 1.0 | o |
| 450 | 0.3 | 0.2 | o |
| 450 | 0.4 | 1.5 | o |
| 450 | 0.5 | 2.5 | x |
| 450 | 0.8 | 3.0 | x |
| 450 | 0.9 | 3.0 | x |
| 450 | 1.0 | 4.0 | o |
| 500 | 0.2 | 0.3 | o |
| 500 | 0.3 | 0.3 | o |
| 500 | 0.4 | 1.0 | o |
| 500 | 0.5 | 3.0 | x |
| 500 | 0.8 | 4.0 | x |
| 500 | 0.9 | 4.5 | x |
| 500 | 1.0 | 4.5 | o |
| 500 | 0.2 | 1.0 | o |
| 500 | 0.3 | 0.2 | o |
| 500 | 0.4 | 1.5 | o |
| 500 | 0.5 | 2.5 | o |
| 500 | 0.8 | 3.0 | x |
| 500 | 0.9 | 3.0 | x |
| 500 | 1.0 | 4.0 | o |
| 1000 | 0.2 | 0.3 | o |
| 1000 | 0.3 | 0.3 | o |
| 1000 | 0.4 | 1.0 | o |
| 1000 | 0.5 | 2.0 | x |
| 1000 | 0.8 | 4.0 | x |
| 1000 | 0.9 | 4.5 | x |
| 1000 | 1.0 | 4.5 | o |
| 1000 | 0.2 | 1.0 | o |
| 1000 | 0.3 | 0.2 | o |
| 1000 | 0.4 | 1.5 | x |
| 1000 | 0.5 | 2.5 | x |
| 1000 | 0.8 | 3.0 | x |
| 1000 | 0.9 | 3.0 | x |
| 1000 | 1.0 | 4.0 | o |
| 1100 | 0.2 | 0.3 | o |
| 1100 | 0.3 | 0.3 | x |
| 1100 | 0.4 | 1.0 | x |
| 1100 | 0.5 | 1.0 | x |
| 1100 | 0.8 | 4.0 | x |
| 1100 | 0.9 | 4.5 | x |
| 1100 | 1.0 | 4.5 | o |
| 1100 | 0.2 | 1.0 | o |
| 1100 | 0.3 | 0.2 | o |
| 1100 | 0.4 | 1.5 | x |
| 1100 | 0.5 | 2.5 | x |
| 1100 | 0.8 | 3.0 | x |
| 1100 | 0.9 | 3.0 | x |
| 1100 | 1.0 | 4.0 | o |

When the multiplication values of strengths and the thicknesses of two coated steel sheets connected to each other by a joint portion are different from each other, a difference occurs in the amount of components introduced into the joint portion while a laser beam is applied. Therefore, in order for the joint portion to exist as a full austenite structure at a hot stamping heating temperature and to be transformed into a martensitic structure having an area fraction of 90° % or greater upon cooling, preferably a full martensite structure, content of carbon (C) and manganese (M) contained in a filler wire may be differently adjusted according to a difference between products of strengths and thicknesses of two coated steel sheets.

As can be seen in Table 1, when the difference between the multiplication values of the strengths and thicknesses of the two coated steel sheets is less than or equal to 500 MPA×mm, the filler wire may contain carbon (C) in an amount of 0.5 wt % to 0.9 wt % and manganese (Mn) in an amount of 2.5 wt % to 4.5 wt %, and when the difference between the multiplication values of the strengths and thicknesses of the two coated steel sheets is greater than 500 MPA×mm and less than or equal to 1000 MPA×mm, the filler wire may contain carbon (C) in an amount of 0.4 wt % to 0.9 wt % and manganese (Mn) in an amount of 1.5 wt % to 4.5 wt %, and when the difference between the multiplication values of the strengths and thicknesses of the two coated steel sheets is greater than 1000 MPA×mm, the filler wire 200 may contain carbon (C) in an amount of 0.3 wt % to 0.9 wt % and manganese (Mn) in an amount of 0.3 wt % to 4.5 wt %, and thus, the joint portion may be prevented from being fractured.

When the filler wire contains carbon (C) and manganese (M) in the above-described range according to the difference between the multiplication values of the strengths and thicknesses of the two coated steel sheets, the content of carbon (C) and manganese (M) contained in the joint portion to be formed is also changed depending on the difference between the multiplication values of the strengths and thicknesses of the two coated steel sheets, and in this case, even when components of the first coated layer and the second coated layer are introduced into the joint portion according to the content of carbon (C) and manganese (M) contained in the joint portion, it is possible to prevent a reduction in hardness and strength of the joint portion, and thus, the joint portion may be prevented from being fractured.

That is, when the difference between the multiplication values of the strengths and thicknesses of the two coated steel sheets to be bonded to each other is less than or equal to 500 MPA×mm, the joint portion contains carbon (C) of 0.25 wt % to 0.4 wt % and manganese (Mn) of 1.5 wt % to 2.5 wt %, and when the difference between the multiplication values of the strengths and thicknesses of the two coated steel sheets is greater than 500 MPA×mm and less than or equal to 1000 MPA×mm, the joint portion contains carbon (C) of 0.2 wt % to 0.3 wt % and manganese (Mn) of 1.0 wt % to 2.0 wt %, and when the difference between the multiplication values of the strengths and thicknesses of the two coated steel sheets is greater than 1000 MPA×mm, the joint portion contains carbon (C) of 0.1 wt % to 0.25 wt % and manganese (Mn) of 0.8 wt % to 1.5 wt %, and thus, the joint portion may exist as a full austenite structure at a hot stamping heating temperature and may be transformed into a martensitic structure having an area fraction of 90% or greater upon cooling, preferably a full martensitic structure.

Examples 2 to 16 and Comparative Examples 1 to 12

An aluminum coated blank was manufactured in the same manner as in Example 1, except that the aluminum coated steel sheet was bonded by applying conditions of power, radius, and frequency of a laser beam, and a formation speed of a joint portion in the conditions of Table 2 below.

Experimental Example (1) hardness test: three aluminum coated blank specimens of Embodiments 1 to 16 and Comparative Examples 1 to 12 were respectively manufactured, each specimen was heated to an austenite single phase region temperature or higher (Ac3 or higher), cooled to 300° C. or less at a cooling rate of 10 to 500° C./s, and then, an average hardness value of a joint portion of the aluminum coated blank and the aluminum coated steel sheet were measured. Here, the hardness was measured by a Vickers hardness test method (load 300 g) of metallic materials, and when the minimum hardness of the joint portion is greater than or equal to an average hardness of a base iron, it is determined as Pass, and when the minimum hardness of the joint portion is less than the average hardness, it is determined as Fail, and the results are shown in following Table 2. In addition, the minimum hardness of the joint portion is the smallest value of the measured hardness values of the joint portion at five points spaced apart from each other at regular intervals, and the average hardness of the base iron is an average value of the hardness values of the base iron measured at five points spaced apart from each other at regular intervals.

beam when the coated layer of the aluminum coated steel sheet and the base iron were melted, and thus, the minimum hardness of the joint portion was formed to be less than the average hardness of the base iron.

In a case of Comparative Examples 3, 4, 9, and 10, even though a radius value of the laser beam was set to the maximum (1.0 mm) and the formation speed of the joint portion was set to the minimum (1 m/min), a frequency thereof was lower, and thus, a distance of a movement path of the laser beam was increased, and when the coated layer and the base iron of the aluminum coated steel sheet are melted by the laser beam, there was a portion in which components of the coated layer was not sufficiently diluted with components of the base iron, and thus, the minimum hardness of the joint portion was formed to be less than the average hardness of the base iron.

In addition, in a case of Comparative Examples 5, 6, 11, and 12, energy density was sufficient and the radius of the laser beam was also maximized, but a speed was too fast to increase a distance of a movement path of the laser beam,

TABLE 2

| Classification | Beam power (kW) | Beam radius (mm) | Frequency (Hz) | Formation speed of joint portion (m/min) | Hardness test results (Pass/Fail) |
| --- | --- | --- | --- | --- | --- |
| Embodiment 1 | 1 | 0.1 | 100 | 1 | Pass |
| Embodiment 2 | 1 | 0.1 | 1500 | 1 | Pass |
| Embodiment 3 | 1 | 0.1 | 100 | 10 | Pass |
| Embodiment 4 | 1 | 0.1 | 1500 | 10 | Pass |
| Embodiment 5 | 1 | 1 | 100 | 1 | Pass |
| Embodiment 6 | 1 | 1 | 1500 | 1 | Pass |
| Embodiment 7 | 1 | 1 | 100 | 10 | Pass |
| Embodiment 8 | 1 | 1 | 1500 | 10 | Pass |
| Comprative example 1 | 1 | 0.05 | 100 | 1 | Fail |
| Comprative example 2 | 1 | 0.05 | 1500 | 1 | Fail |
| Comprative example 3 | 1 | 0.1 | 90 | 1 | Fail |
| Comprative example 4 | 1 | 1 | 90 | 1 | Fail |
| Comprative example 5 | 1 | 1 | 100 | 11 | Fail |
| Comprative example 6 | 1 | 1 | 1500 | 11 | Fail |
| Embodiment 9 | 1 | 0.32 | 100 | 1 | Pass |
| Embodiment 10 | 1 | 0.32 | 1500 | 10 | Pass |
| Embodiment 11 | 10 | 1 | 100 | 1 | Pass |
| Embodiment 12 | 10 | 1 | 1500 | 10 | Pass |
| Embodiment 13 | 20 | 0.1 | 100 | 1 | Pass |
| Embodiment 14 | 20 | 0.1 | 1500 | 1 | Pass |
| Embodiment 15 | 20 | 0.1 | 100 | 10 | Pass |
| Embodiment 16 | 20 | 0.1 | 1500 | 10 | Pass |
| Comprative example 7 | 20 | 0.05 | 100 | 1 | Fail |
| Comprative example 8 | 20 | 0.05 | 1500 | 1 | Fail |
| Comprative example 9 | 20 | 0.1 | 90 | 1 | Fail |
| Comprative example 10 | 20 | 1 | 90 | 1 | Fail |
| Comprative example 11 | 20 | 1 | 100 | 11 | Fail |
| Comprative example 12 | 20 | 1 | 1500 | 11 | Fail |

Hereinafter, in the present disclosure, it is assumed that "energy density" is a value obtained by dividing beam power P (kW) of a laser oscillator by a laser beam area ($\pi r^2$) on a surface of a steel sheet (where r is a radius of a laser beam).

Referring to the results of Table 2, it can be seen that, when Embodiments 1 to 16 satisfy applying the laser beam and a formation speed of a joint portion of the present disclosure, a minimum hardness of the joint portion was greater than or equal to an average hardness of abase iron.

Meanwhile, in a case of Comparative Examples 1, 2, 7, and 8, energy density was sufficient, but a radius of a laser beam was smaller even when the formation speed of the joint portion was minimized, and thus, there was a portion in which the component of the coated layer was not sufficiently diluted with components of the base iron by the laser and when the coated layer and the base iron of the aluminum coated steel sheet were melted, there was a portion in which the components of the coated layer were not sufficiently diluted with the components of the base iron, and thus, the minimum hardness of the joint portion was formed to be less than the average hardness of the base iron.

Examples 17-68 and Comparative Examples 13-52

The aluminum coated steel sheet was bonded by applying conditions of power, radius, and frequency of the laser beam and a formation speed of the joint portion according to Tables 3 to 6 below, and the conditions according to Equation 1 below, and while the laser head moved in parallel and in the same direction as a direction in which the joint portion was formed, an aluminum coated blank was manufactured in the same manner as in Embodiment 1, except that the laser beam was applied while performing a pattern movement of 45 degrees with respect to the direction in which the joint portion is formed.

$$\left(\frac{f \times r}{v}\right)^{\alpha} \geq 1 \quad \text{[Equation 1]}$$

(In Equation 1, $\alpha$ is 0.7, f is a frequency (Hz) of the laser beam, r is a radius (mm) of the laser beam measured on a surface of the aluminum coated steel sheet, and v is a formation speed (mm/sec) of the joint portion).

Experimental Example (2) aluminum (Al) segregation fraction (%) of joint portion and tension test: three blank specimens of Embodiments 17 to 68 and Comparative Examples 13 to 52 were manufactured, respectively, and each specimen was heated to an austenite single phase region temperature or higher (Ac3 or higher) and cooled to 300° C. or less at a cooling rate of 10 to 500° C./s. Then, the aluminum segregation area fraction and tension of the joint portion of each specimen were tested, and the results are shown in Table 3 to Table 6 below. Specifically, measurement of an area fraction of aluminum (Al) segregation of the joint portion was represented as an average value of the Al segregation area fraction of the three specimens, and as a tension test result, when tensile force is applied to the specimen and the joint portion is not fractured, all three specimens are represented as Pass, and when the joint portion is fractured more than once, the three specimens are represented as Fail.

TABLE 3

| Classification | Beam power (kW) | Formation speed of joint portion (m/min) | Beam radius (mm) | Frequency (Hz) | Equation 1 (v:mm/sec) | Area fraction of Al segregation (%) | Tension test results (Pass/Fail) |
|---|---|---|---|---|---|---|---|
| Embodiment 17 | 1 | 1 | 0.1 | 1500 | 4.66 | 4.2 | Pass |
| Embodiment 18 | 1 | 1 | 1 | 100 | 3.51 | 3.6 | Pass |
| Embodiment 19 | 1 | 1 | 1 | 1500 | 23.34 | 5 | Pass |
| Embodiment 20 | 1 | 3 | 0.1 | 1500 | 2.16 | 1.1 | Pass |
| Embodiment 21 | 1 | 3 | 0.4 | 130 | 1.03 | 1 | Pass |
| Embodiment 22 | 1 | 3 | 0.4 | 1500 | 5.7 | 3.1 | Pass |
| Embodiment 23 | 1 | 3 | 1 | 100 | 1.63 | 1.1 | Pass |
| Embodiment 24 | 1 | 3 | 1 | 1500 | 10.82 | 4.2 | Pass |
| Embodiment 25 | 1 | 5 | 0.1 | 1500 | 1.51 | 1.6 | Pass |
| Embodiment 26 | 1 | 5 | 1 | 100 | 1.14 | 1.2 | Pass |
| Embodiment 27 | 1 | 5 | 1 | 500 | 7.57 | 3.9 | Pass |
| Embodiment 28 | 1 | 7 | 0.1 | 1500 | 1.2 | 1.3 | Pass |
| Embodiment 29 | 1 | 7 | 1 | 1500 | 5.98 | 3.3 | Pass |
| Comparative example 13 | 1 | 1 | 0.1 | 100 | 0.7 | 18.7 | Fail |
| Comparative example 14 | 1 | 1 | 0.1 | 100 | 0.98 | 18.3 | Fail |
| Comparative example 15 | 1 | 3 | 0.1 | 100 | 0.33 | 14.2 | Fail |
| Comparative example 16 | 1 | 3 | 0.4 | 100 | 0.86 | 13.6 | Fail |
| Comparative example 17 | 1 | 5 | 0.1 | 100 | 0.23 | 11.2 | Fail |
| Comparative example 18 | 1 | 7 | 0.1 | 100 | 0.18 | 19.2 | Fail |
| Comparative example 19 | 1 | 7 | 1 | 100 | 0.9 | 14.5 | Fail |
| Comparative example 20 | 1 | 8 | 0.1 | 1500 | 1.09 | 13.9 | Fail |
| Comparative example 21 | 1 | 8 | 1 | 1500 | 5.45 | 15.7 | Fail |
| Comparative example 22 | 1 | 10 | 1 | 1500 | 4.66 | 19.5 | Fail |

TABLE 4

| Classification | Beam power (kW) | Formation speed of joint portion (m/min) | Beam radius (mm) | Frequency (Hz) | Equation 1 (v:mm/sec) | Area fraction of Al segregation (%) | Tension test results (Pass/Fail) |
|---|---|---|---|---|---|---|---|
| Embodiment 30 | 3 | 1 | 0.1 | 1500 | 4.66 | 4.9 | Pass |
| Embodiment 31 | 3 | 1 | 1 | 100 | 3.51 | 4.8 | Pass |
| Embodiment 32 | 3 | 1 | 1 | 1500 | 23.34 | 4.8 | Pass |
| Embodiment 33 | 3 | 3 | 0.1 | 1500 | 2.16 | 2.1 | Pass |
| Embodiment 34 | 3 | 3 | 0.4 | 130 | 1.03 | 0 | Pass |
| Embodiment 35 | 3 | 3 | 0.4 | 1500 | 5.7 | 3.9 | Pass |
| Embodiment 36 | 3 | 3 | 1 | 100 | 1.63 | 1.2 | Pass |
| Embodiment 37 | 3 | 3 | 1 | 1500 | 10.82 | 4.6 | Pass |
| Embodiment 38 | 3 | 5 | 0.1 | 1500 | 1.51 | 1.4 | Pass |
| Embodiment 39 | 3 | 5 | 1 | 100 | 1.14 | 0.9 | Pass |
| Embodiment 40 | 3 | 5 | 1 | 1500 | 7.57 | 3.1 | Pass |
| Embodiment 41 | 3 | 7 | 0.1 | 1500 | 1.2 | 1.2 | Pass |
| Embodiment 42 | 3 | 7 | 1 | 1500 | 5.98 | 3.9 | Pass |
| Comparative example 23 | 3 | 1 | 0.1 | 100 | 0.7 | 15.1 | Fail |
| Comparative example 24 | 3 | 1 | 0.1 | 160 | 0.98 | 14.6 | Fail |
| Comparative example 25 | 3 | 3 | 0.1 | 100 | 0.33 | 12.8 | Fail |
| Comparative example 26 | 3 | 3 | 0.4 | 100 | 0.86 | 17.7 | Fail |

TABLE 4-continued

| Classification | Beam power (kW) | Formation speed of joint portion (m/min) | Beam radius (mm) | Frequency (Hz) | Equation 1 (v:mm/sec) | Area fraction of Al segregation (%) | Tension test results (Pass/Fail) |
|---|---|---|---|---|---|---|---|
| Comparative example 27 | 3 | 5 | 0.1 | 100 | 0.23 | 16.3 | Fail |
| Comparative example 28 | 3 | 7 | 0.1 | 100 | 0.18 | 16.1 | Fail |
| Comparative example 29 | 3 | 7 | 1 | 100 | 0.9 | 14.1 | Fail |
| Comparative example 30 | 3 | 8 | 0.1 | 1500 | 1.09 | 13.6 | Fail |
| Comparative example 31 | 3 | 8 | 1 | 1500 | 5.45 | 11.6 | Fail |
| Comparative example 32 | 3 | 10 | 1 | 1500 | 4.66 | 16.7 | Fail |

TABLE 5

| Classification | Beam power (kW) | Formation speed of joint portion (m/min) | Beam radius (mm) | Frequency (Hz) | Equation 1 (v:mm/sec) | Area fraction of Al segregation (%) | Tension test results (Pass/Fail) |
|---|---|---|---|---|---|---|---|
| Comparative example 33 | 7 | 1 | 0.1 | 100 | 0.7 | 14.2 | Fail |
| Comparative example 34 | 7 | 1 | 0.1 | 160 | 0.98 | 16.7 | Fail |
| Comparative example 35 | 7 | 3 | 0.1 | 100 | 0.33 | 15.2 | Fail |
| Comparative example 36 | 7 | 3 | 0.1 | 100 | 0.86 | 11.6 | Fail |
| Comparative example 37 | 7 | 5 | 0.1 | 100 | 0.23 | 11 | Fail |
| Comparative example 38 | 7 | 7 | 0.1 | 100 | 0.18 | 11.2 | Fail |
| Comparative example 39 | 7 | 7 | 1 | 100 | 0.9 | 12.6 | Fail |
| Comparative example 40 | 7 | 8 | 0.1 | 1500 | 1.09 | 13.2 | Fail |
| Comparative example 41 | 7 | 8 | 1 | 1500 | 5.45 | 17 | Fail |
| Comparative example 42 | 7 | 10 | 1 | 1500 | 4.66 | 19.5 | Fail |
| Embodiment 43 | 7 | 1 | 0.1 | 1500 | 4.66 | 5 | Pass |
| Embodiment 44 | 7 | 1 | 1 | 100 | 3.51 | 4.1 | Pass |
| Embodiment 45 | 7 | 1 | 1 | 1500 | 23.34 | 4.9 | Pass |
| Embodiment 46 | 7 | 3 | 0.1 | 1500 | 2.16 | 1.1 | Pass |
| Embodiment 47 | 7 | 3 | 0.4 | 130 | 1.03 | 1 | Pass |
| Embodiment 48 | 7 | 3 | 0.4 | 1500 | 5.7 | 3.9 | Pass |
| Embodiment 49 | 7 | 3 | 1 | 100 | 1.63 | 1.8 | Pass |
| Embodiment 50 | 7 | 3 | 1 | 1500 | 10.82 | 4.1 | Pass |
| Embodiment 51 | 7 | 5 | 0.1 | 1500 | 1.51 | 1.7 | Pass |
| Embodiment 52 | 7 | 5 | 1 | 100 | 1.14 | 1.2 | Pass |
| Embodiment 53 | 7 | 5 | 1 | 1500 | 7.57 | 3.5 | Pass |
| Embodiment 54 | 7 | 7 | 0.1 | 1500 | 1.2 | 1.9 | Pass |
| Embodiment 55 | 7 | 7 | 1 | 1500 | 5.98 | 3.4 | Pass |

TABLE 6

| Classification | Beam power (kW) | Formation speed of joint portion (m/min) | Beam radius (mm) | Frequency (Hz) | Equation 1 (v:mm/sec) | Area fraction of Al segregation (%) | Tension test results (Pass/Fail) |
|---|---|---|---|---|---|---|---|
| Comparative example 43 | 20 | 1 | 0.1 | 100 | 0.7 | 12.2 | Fail |
| Comparative example 44 | 20 | 1 | 0.1 | 160 | 0.98 | 10.9 | Fail |
| Comparative example 45 | 20 | 3 | 0.1 | 100 | 0.33 | 15.2 | Fail |
| Comparative example 46 | 20 | 3 | 0.4 | 100 | 0.86 | 14 | Fail |
| Comparative example 47 | 20 | 5 | 0.1 | 100 | 0.23 | 15.5 | Fail |
| Comparative example 48 | 20 | 7 | 0.1 | 100 | 0.18 | 20.9 | Fail |
| Comparative example 49 | 20 | 7 | 1 | 100 | 0.9 | 12.2 | Fail |
| Comparative example 50 | 20 | 8 | 0.1 | 1500 | 1.09 | 13.9 | Fail |
| Comparative example 51 | 20 | 8 | 1 | 1500 | 5.45 | 12.7 | Fail |
| Comparative example 52 | 20 | 10 | 1 | 1500 | 4.66 | 16.1 | Fail |
| Embodiment 56 | 20 | 1 | 0.1 | 1500 | 4.66 | 3.9 | Pass |
| Embodiment 57 | 20 | 1 | 1 | 100 | 3.51 | 4 | Pass |
| Embodiment 58 | 20 | 1 | 1 | 1500 | 23.34 | 3 | Pass |
| Embodiment 59 | 20 | 3 | 0.1 | 1500 | 2.16 | 1.9 | Pass |
| Embodiment 60 | 20 | 3 | 0.4 | 130 | 1.03 | 1.3 | Pass |
| Embodiment 61 | 20 | 3 | 0.4 | 1500 | 5.7 | 3.2 | Pass |
| Embodiment 62 | 20 | 3 | 1 | 100 | 1.63 | 0 | Pass |
| Embodiment 63 | 20 | 3 | 1 | 1500 | 10.82 | 5 | Pass |

TABLE 6-continued

| Classification | Beam power (kW) | Formation speed of joint portion (m/min) | Beam radius (mm) | Frequency (Hz) | Equation 1 (v:mm/sec) | Area fraction of Al segregation (%) | Tension test results (Pass/Fail) |
|---|---|---|---|---|---|---|---|
| Embodiment 64 | 20 | 5 | 0.1 | 1500 | 1.51 | 1.2 | Pass |
| Embodiment 65 | 20 | 5 | 1 | 100 | 1.14 | 1.3 | Pass |
| Embodiment 66 | 20 | 5 | 1 | 1500 | 7.57 | 4.4 | Pass |
| Embodiment 67 | 20 | 7 | 0.1 | 1500 | 1.2 | 1.3 | Pass |
| Embodiment 68 | 20 | 7 | 1 | 1500 | 5.98 | 3 | Pass |

Referring to the results of Tables 3 to Table 6, in a case of Embodiments 17 to 68 of the present disclosure, the condition of Equation 1 was satisfied, and the aluminum segregation area fraction of the joint portion satisfied 5% or less, and as the tension test result, the joint portion was not fractured (PASS). However, in a case of Comparative Examples 13 to 52 out of the conditions of the present disclosure, when the condition of Equation 1 of the present disclosure was not satisfied, the aluminum segregation area fraction of the joint portion exceeded 5%, and the joint was fractured during the tension test. In addition, even though Equation 1 was satisfied, when a formation speed of the joint portion exceeded 7 m/min, a formation speed of the joint portion was high to cause the laser beam to be not sufficiently stirred to the inside of the base iron, resulting in excessive aluminum segregation, and thus, the joint portion was fractured during tension test.

Examples 69-98 and Comparative Examples 53-72

The aluminum coated steel sheet was bonded by applying conditions of power, radius, and frequency of the laser beam and a formation speed of the joint portion according to Tables 7 and Table 8 below, and while the laser head moved in parallel and in the same direction as a direction in which the joint portion was formed, an aluminum coated blank was manufactured in the same manner as in Embodiment 1, except that the laser beam was applied at a pattern angle of the conditions of Table 7 and Table 8 below with respect to the direction in which the joint portion was formed. In this case, the pattern angle indicates an angle that the direction in which the joint portion is formed and the movement path of the laser beam forms on a surface of the coated steel sheet when the joint portion is formed.

Experimental Example (3) checking of Aluminum (Al) segregation fraction (%) of joint portion, aluminum segregation of a boundary surface of joint portion, and fracture of joint portion: three blank specimens of Embodiments 69 to 98 and Comparative Examples 53 to 72 were manufactured, each specimen was heated to an austenite single phase region temperature or higher (Ac3 or higher) and cooled to 300° C. or lower at a cooling rate of 10 to 500° C./s. Next, an aluminum segregation area fraction of the joint portion of each specimen, whether or not aluminum segregation occurred at the boundary surface of the joint portion, and the tension test results are shown in Tables 7 and 8 below. Specifically, measurement of an area fraction of aluminum (Al) segregation of the joint portion was represented as an average value of the Al segregation area fraction of the three specimens, and as a tension test result, a case in which tensile force is applied to the specimen and all three specimens have no fracture in joint portions is determined as x, and when all three specimens have fracture in the joint portions more than once is determined as o.

TABLE 7

| Classification | Beam power (kW) | Formation speed of joint portion (m/min) | Beam radius (mm) | Frequency (Hz) | Pattern angle (Degree) | Area fraction of Al segregation (%) | Al segregation at boundary surface of joint portion | Fraction of joint portion |
|---|---|---|---|---|---|---|---|---|
| Comparative example 53 | 3 | 1 | 0.1 | 1500 | 20 | 4.8 | Yes | o |
| Comparative example 54 | | | | | 40 | 4.1 | Yes | o |
| Embodiment 69 | | | | | 45 | 4.9 | No | x |
| Embodiment 70 | | | | | 60 | 4.1 | No | x |
| Embodiment 71 | | | | | 85 | 3.2 | No | x |
| Comparative example 55 | 3 | 1 | 1 | 100 | 20 | 4.8 | Yes | o |
| Comparative example 56 | | | | | 40 | 4.2 | Yes | o |
| Embodiment 72 | | | | | 45 | 0 | No | x |
| Embodiment 73 | | | | | 60 | 4.1 | No | x |
| Embodiment 74 | | | | | 85 | 3.4 | No | x |
| Comparative example 57 | 3 | 1 | 1 | 1500 | 20 | 4.8 | Yes | o |
| Comparative example 58 | | | | | 40 | 4.3 | Yes | o |
| Embodiment 75 | | | | | 45 | 0 | No | x |
| Embodiment 76 | | | | | 60 | 4.5 | No | x |
| Embodiment 77 | | | | | 85 | 3.1 | No | x |
| Comparative example 59 | 3 | 7 | 0.1 | 1500 | 20 | 3.2 | Yes | o |
| Comparative example 60 | | | | | 40 | 2.2 | Yes | o |
| Embodiment 78 | | | | | 45 | 1.2 | No | x |
| Embodiment 79 | | | | | 60 | 1.8 | No | x |
| Embodiment 80 | | | | | 85 | 0.5 | No | x |
| Comparative example 61 | 3 | 7 | 1 | 1500 | 20 | 4.7 | Yes | o |
| Comparative example 62 | | | | | 40 | 4.2 | Yes | o |

TABLE 7-continued

| Classification | Beam power (kW) | Formation speed of joint portion (m/min) | Beam radius (mm) | Frequency (Hz) | Pattern angle (Degree) | Area fraction of Al segregation (%) | Al segregation at boundary surface of joint portion | Fraction of joint portion |
|---|---|---|---|---|---|---|---|---|
| Embodiment 81 | | | | | 45 | 3.9 | No | x |
| Embodiment 82 | | | | | 60 | 1.5 | No | x |
| Embodiment 83 | | | | | 85 | 0 | No | x |

TABLE 8

| Classification | Beam power (kW) | Formation speed of joint portion (m/min) | Beam radius (mm) | Frequency (Hz) | Pattern angle (Degree) | Area fraction of Al segregation (%) | Al segregation at boundary surface of joint portion | Fraction of joint portion |
|---|---|---|---|---|---|---|---|---|
| Comparative example 63 | 7 | 1 | 0.1 | 1500 | 20 | 4.6 | Yes | o |
| Comparative example 64 | | | | | 40 | 4.1 | Yes | o |
| Embodiment 84 | | | | | 45 | 5 | No | x |
| Embodiment 85 | | | | | 60 | 4.1 | No | x |
| Embodiment 86 | | | | | 85 | 3.9 | No | x |
| Comparative example 65 | 7 | 1 | 1 | 100 | 20 | 4.7 | Yes | o |
| Comparative example 66 | | | | | 40 | 3.9 | Yes | o |
| Embodiment 87 | | | | | 45 | 3.5 | No | x |
| Embodiment 88 | | | | | 60 | 3.5 | No | x |
| Embodiment 89 | | | | | 85 | 3.5 | No | x |
| Comparative example 67 | 7 | 1 | 1 | 1500 | 20 | 4.7 | Yes | o |
| Comparative example 68 | | | | | 40 | 4.5 | Yes | o |
| Embodiment 90 | | | | | 45 | 4.9 | No | x |
| Embodiment 91 | | | | | 60 | 4.1 | No | x |
| Embodiment 92 | | | | | 85 | 2.8 | No | x |
| Comparative example 69 | 7 | 7 | 0.1 | 1500 | 20 | 4.9 | Yes | o |
| Comparative example 70 | | | | | 40 | 3.5 | Yes | o |
| Embodiment 93 | | | | | 45 | 1.9 | No | x |
| Embodiment 94 | | | | | 60 | 1.8 | No | x |
| Embodiment 95 | | | | | 85 | 1.1 | No | x |
| Comparative example 71 | 7 | 7 | 1 | 1500 | 20 | 4.8 | Yes | o |
| Comparative example 72 | | | | | 40 | 3.8 | Yes | o |
| Embodiment 96 | | | | | 45 | 3.4 | No | x |
| Embodiment 97 | | | | | 60 | 2.8 | No | x |
| Embodiment 98 | | | | | 85 | 1.9 | No | x |

Meanwhile, even though an area fraction of aluminum segregation of the joint portion satisfies 5% or less, when aluminum (Al) segregation occurs at a boundary surface between the joint portion and the base iron, there is a high possibility that fracture occurs in the joint portion, specifically, at the boundary surface between the joint portion and the steel sheet. Referring to the results of Tables 7 and Table 8, in a case of the embodiment in which a pattern angle was greater than or equal to 45 degrees and less than 90 degrees, aluminum segregation of the joint portion was formed in an area fraction of 5% or less, and it was possible to prevent aluminum (AL) segregation from occurring at a boundary surface between the joint portion and base iron, and the joint portion was prevented from being fractured during tension test. Meanwhile, in a case of Comparative Examples 53 to 72 to which a pattern angle of 45 degrees or less was applied, it was found that aluminum segregation occurred at the boundary surface of the joint portion and the joint portion was fractured.

Figure 6:
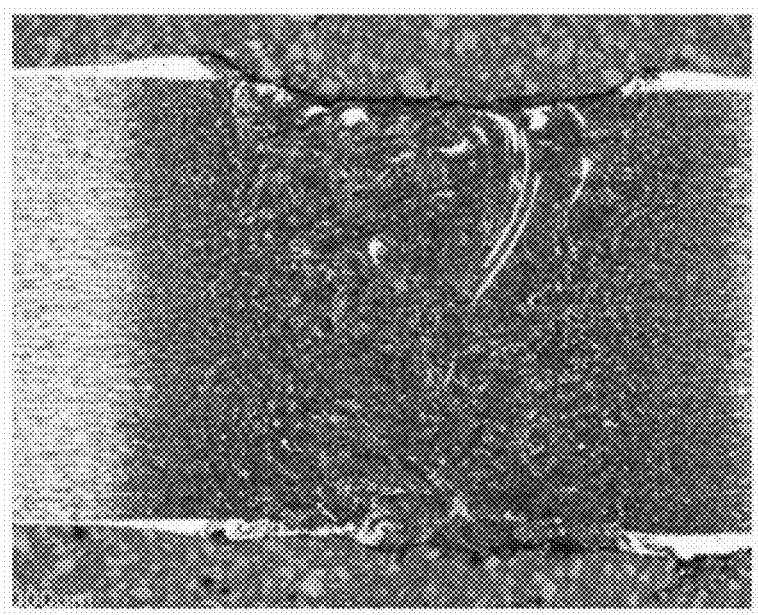
FIGS. 6 and 7 are cross-sectional views each illustrating a cross section of an aluminum blank.
Figure 7:
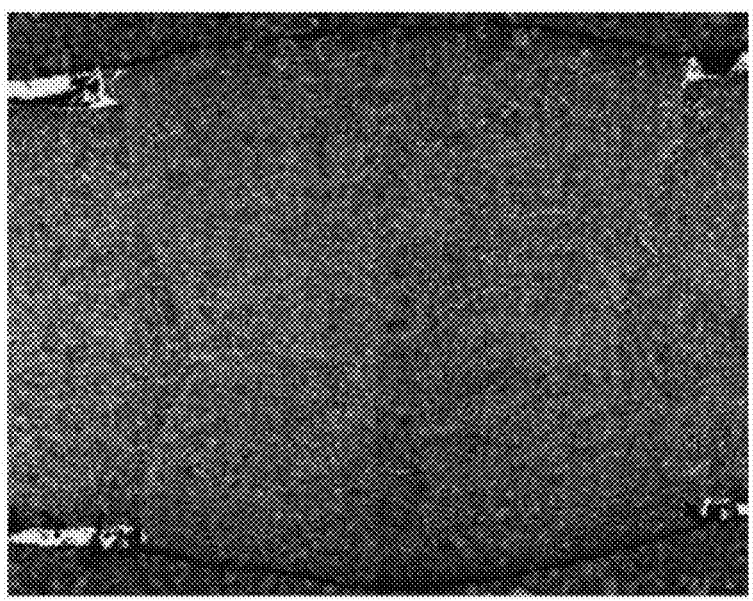

FIG. 6 is a cross-section of an aluminum blank manufactured by a method of the related art in which the aluminum blank is bonded by a laser beam and the laser beam is not applied at a predetermined pattern angle, and FIG. 7 is an optical microscope photograph illustrating a cross-section of the aluminum blank of Example 1. Referring to FIGS. 6 and 7, when applying the method of the related art in which the laser beam was not applied at a predetermined pattern angle, components of the coated layer was not sufficiently diluted with components of the base iron to cause an area fraction of aluminum segregation of the joint portion to increase, but in a case of Embodiment 1, it was found that the components of the coated layer were sufficiently diluted with the components of the base iron to cause occurrence of aluminum segregation in the joint portion to be minimized.

Figure 8:
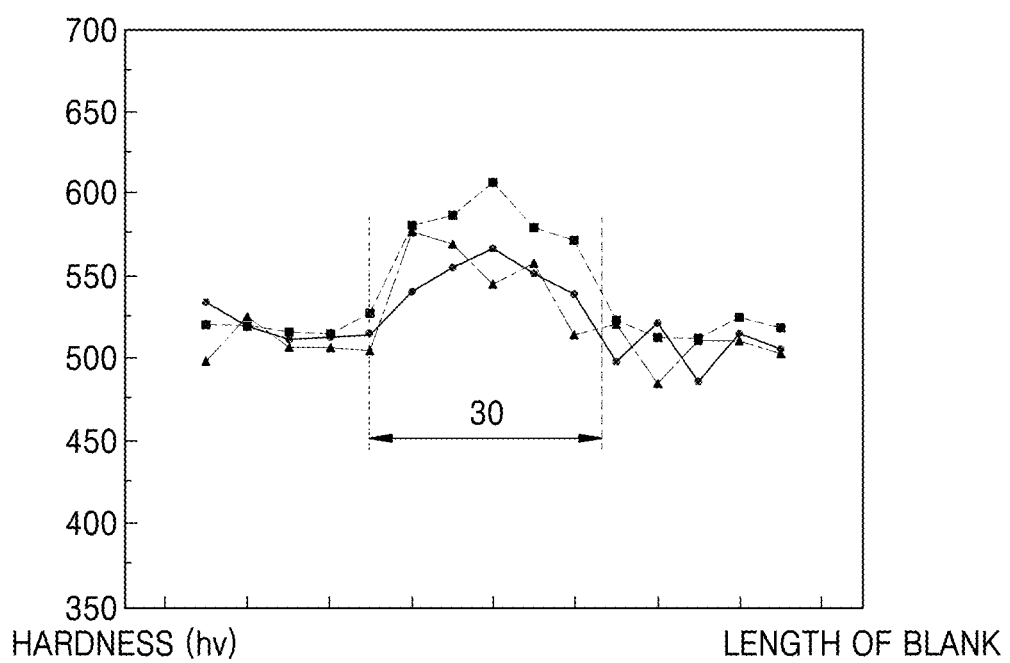
FIGS. 8 and 9 are graphs illustrating changes in hardness for each portion of the aluminum blank after hot stamping molding.
Figure 9:
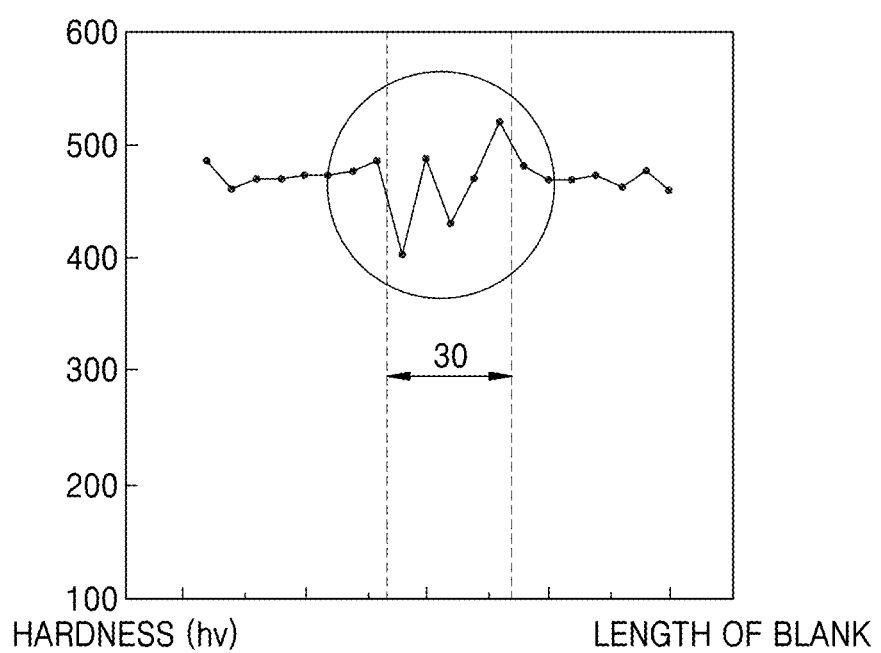

FIG. 8 is a graph illustrating changes in hardness for each portion of the aluminum blank after hot stamping molding of Embodiment 7, and FIG. 9 is a graph illustrating changes in hardness for each portion of the aluminum blank of Comparative Example 5. Referring to FIGS. 8 and 9, in Embodiment 7, the minimum hardness of the joint portion 30 after hot stamping molding was greater than or equal to the average hardness of the base iron, but in a case of Comparative Example 5 out of the conditions of the present disclosure, it was found that the minimum hardness of the joint portion 30 after hot stamping molding was less than the average hardness of the base iron.

Figure 10:
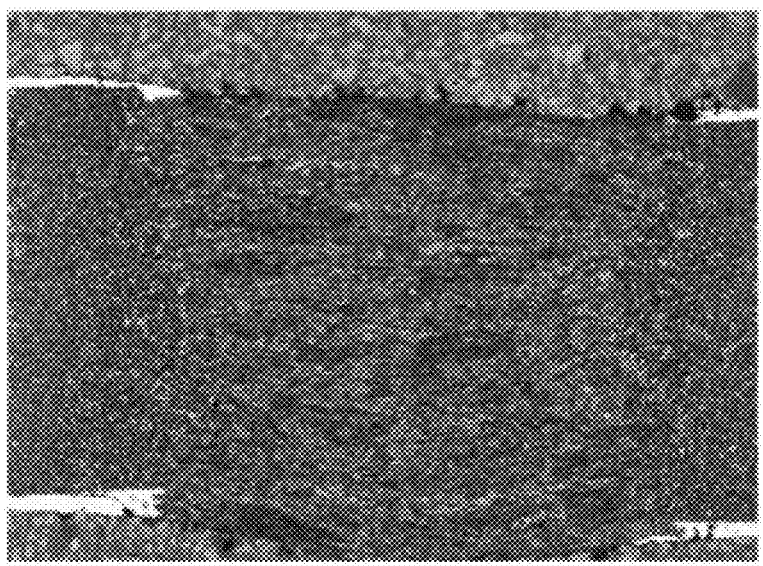
FIGS. 10 and 11 are cross-sectional views illustrating a cross section of an aluminum blank.
Figure 11:
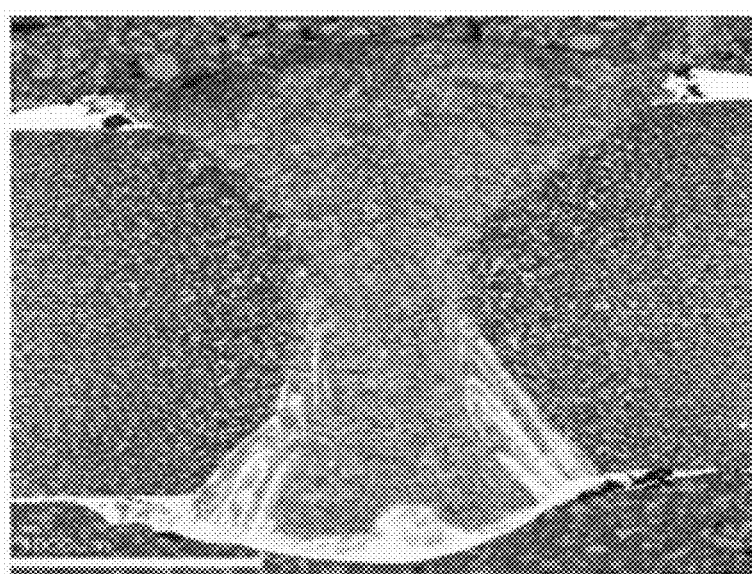

FIG. 10 is a cross-sectional view of the aluminum blank of Embodiment 34, and FIG. 11 is an optical microscope photograph illustrating a cross-section of the aluminum blank of Comparative Example 28.

Referring to FIGS. 10 and 11, the aluminum blank of Example 34 minimized the aluminum segregation of the joint portion, but in a case of Comparative Example 28 out of the conditions of Equation 1 of the present disclosure, it was found that occurrence of aluminum segregation of the aluminum blank increased compared to Example 34.

The aluminum coated blank according to the present disclosure is manufactured by bonding two or more aluminum coated steel sheets having at least one of strengths and thicknesses different from each other, and it is possible to minimize a reduction in hardness and physical properties of a blank joint portion, and to prevent defects such as segregation of the blank joint portion from occurring, and to minimize fracture of the joint portion occurring when segregation is phase-changed to an Al—Fe intermetallic compound by a hot stamping process.

While the present invention is described with reference to exemplary embodiments with reference to the figures, it should be understood that exemplary embodiments described herein should be considered in a descriptive sense only and it will be understood by those of ordinary skill in the art that various changes in form and details may be made therein. Thus, the scope of the present invention for protection should be determined without departing from the spirit and scope of the disclosure as defined by the following claims.

What is claimed is:

1. An apparatus for manufacturing an aluminum-coated blank comprising two or more aluminum-coated steel sheets connected together by a joint portion, comprising:
    a laser generating unit configured to generate laser light;
    a steel sheet loading unit on which a first coated steel sheet and a second coated steel sheet are disposed such that edges of the first coated steel sheet and the second coated steel sheet face each other;
    a filler wire supply unit configured to supply a filler wire at a boundary between the first coated steel sheet and the second coated steel sheet; and
    a laser head configured to irradiate a laser beam to the facing portions of the first coated steel sheet and the second coated steel sheet and the supplied filler wire by using the laser light supplied from the laser generating unit,
    wherein when a difference between a value from multiplication of a first strength and a first thickness of the first coated steel sheet and a value from multiplication of a second strength and a second thickness of the second coated steel sheet is less than or equal to 500 MPA×mm, the filler wire contains carbon (C) of 0.5 wt % to 0.9 wt %, and manganese (Mn) of 2.5 wt % to 4.5 wt %.
    wherein when a difference between a value from moltiplication of a first strength and a first thickness of the first coated steel sheet and a value from multiplication of a second strength and a second thickness of the second coated steel sheet is greater 500 MPA/mm and less than or equal to 1000 MPA/mm, the filler wire contains carbon (C) of 0.4 wt % to 0.9 wt % and manganese (Mn) of 1.5 wt % to 4.5 wt %, and
    wherein when a difference between the value from multiplication of a first strength and a first thickness of the first coated steel sheet and a value from multiplication of a second strength and a second thickness of the second coated steel sheet is greater than 1000 MPA×mm, the filler wire contains carbon (C) of 0.3 wt % to 0.9 wt % and manganese (MN) of 0.3 wt % and 4.5 wt %.

2. The apparatus of claim 1, wherein the first coated steel sheet and the second coated steel sheet are joined together by irradiating the laser beam so as to form a pattern at a predetermined angle with respect to a direction in which the joint portion is formed.

3. The apparatus of claim 2, wherein the pattern is formed by movement of one or more of the first coated steel sheet and the second coated steel sheet on the steel sheet loading unit and the laser head during the laser beam irradiation.

4. The apparatus of claim 1, wherein the laser beam is applied to reciprocate across the boundary.

5. The apparatus of claim 1, wherein the laser beam has a frequency of about 100 to 1,500 Hz and a radius of the laser beam is about 0.1 to 1.0 mm, and the joint portion formation speed is about 15 to 170 mm/sec.

6. The apparatus of claim 5, wherein the joint portion is formed at a speed of about 1 to 10 m/min.

7. The apparatus of claim 5, the laser beam has a power of 1 to 20 kW.

8. The apparatus of claim 5, wherein the frequency of the laser beam, the radius of the laser beam and the joint portion formation speed satisfy Equation 1:

$$\left(\frac{f \times r}{v}\right)^{\alpha} \geq 1 \qquad \text{Equation 1}$$

wherein a is 0.7, f is the frequency (Hz) of the laser beam, r is the radius (mm) of the laser beam measured from a surface of the coated steel sheet, and v is the joint portion formation speed (mm/sec).

9. The apparatus of claim 1, wherein the joint portion is formed by melting the first coated steel sheet, the second coated steel sheet, and the filler wire together by applying the laser beam.

10. The apparatus of claim 1, wherein each of the first coated steel sheet and the second coated steel sheet includes a base iron and a coated layer that is formed with an adhesion amount of 20 to 100 g/m² on at least one surface of the base iron and includes aluminum.

11. The apparatus of claim 10, wherein the base iron comprises carbon (C) in an amount of 0.01 to 0.5 wt %, silicon (Si) in an amount of 0.01 to 1.0 wt %, manganese (Mn) in an amount of 0.5 to 3.0 wt %, phosphorus (P) in an amount greater than 0 and less than or equal to 0.05 wt %, sulfur(S) in an amount greater than 0 and less than or equal to 0.01 wt %, aluminum (Al) in an amount greater than 0 and less than or equal to 0.1 wt %, nitrogen (N) in an amount greater than 0 and less than or equal to 0.001 wt %, a remainder of iron (Fe), and other inevitable impurities.

12. The apparatus of claim 10, wherein the coated layer comprises a surface layer that is formed on a surface of the base iron and includes aluminum (Al) in an amount of 80 wt % or greater, and an alloy layer that is formed between the surface layer and the base iron, and
    the alloy layer comprises aluminum-iron (Al-Fe) and an aluminum-iron-silicon (Al-Fe-Si) intermetallic compound and comprises iron (Fe) of 20 to 70 wt %.

* * * * *